United States Patent
Fourcand et al.

(10) Patent No.: US 6,847,652 B1
(45) Date of Patent: Jan. 25, 2005

(54) BUS CONTROL MODULE FOR A MULTI-STAGE CLOCK DISTRIBUTION SCHEME IN A SIGNALING SERVER

(75) Inventors: Serge Fourcand, Fairview, TX (US); Curt McKinley, Frisco, TX (US); Val Teodorescu, Plano, TX (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/540,591

(22) Filed: Mar. 31, 2000

(51) Int. Cl.$^7$ .............................. H04L 12/40; G06F 1/04
(52) U.S. Cl. ...................... 370/438; 370/516; 370/522; 379/221.1; 710/129; 713/500; 713/600
(58) Field of Search ................................ 370/360, 386, 370/388, 400, 401, 419, 422, 426, 438, 445, 463, 503, 516, 517, 518, 522; 375/362, 371, 373, 376; 379/219, 221.08, 221.09, 221.1, 251, 252, 268, 269, 271, 290; 710/100, 105, 107, 108, 129; 713/400, 401, 500, 503, 600

(56) References Cited

U.S. PATENT DOCUMENTS

| | | | | |
|---|---|---|---|---|
| 4,495,614 A | * | 1/1985 | Aro et al. .................... | 370/384 |
| 5,812,882 A | * | 9/1998 | Raji et al. ..................... | 710/72 |
| 6,018,529 A | * | 1/2000 | Toth ............................ | 370/463 |
| 6,198,753 B1 | * | 3/2001 | Virdee et al. ................ | 370/509 |
| 6,240,087 B1 | * | 5/2001 | Cummings et al. ......... | 370/360 |
| 6,285,673 B1 | * | 9/2001 | Blackburn et al. .......... | 370/360 |

* cited by examiner

*Primary Examiner*—Alpus H. Hsu
(74) *Attorney, Agent, or Firm*—Danamraj & Youst; Craig A. Hoersten; V. Lawrence Sewell

(57) ABSTRACT

A bus control module as a terminal stage for a multi-stage clock/alarm distribution scheme in a signaling server organized into addressable shelves. A system timing generator provides a framed serial control signal, SFI, addressing hierarchically arranged clock distribution modules and the bus control modules, to distribute a system clock to the bus control modules. Each bus control module provides a copy of the system clock to line cards with which it interfaces. The bus control module reports alarms and status signals from its line interface cards to the system timing generator using another framed serial signal. The bus control module forwards upstream towards the system timing generator a clock signal selected from clocks signals recovered by its line interface cards from received network signals.

20 Claims, 24 Drawing Sheets

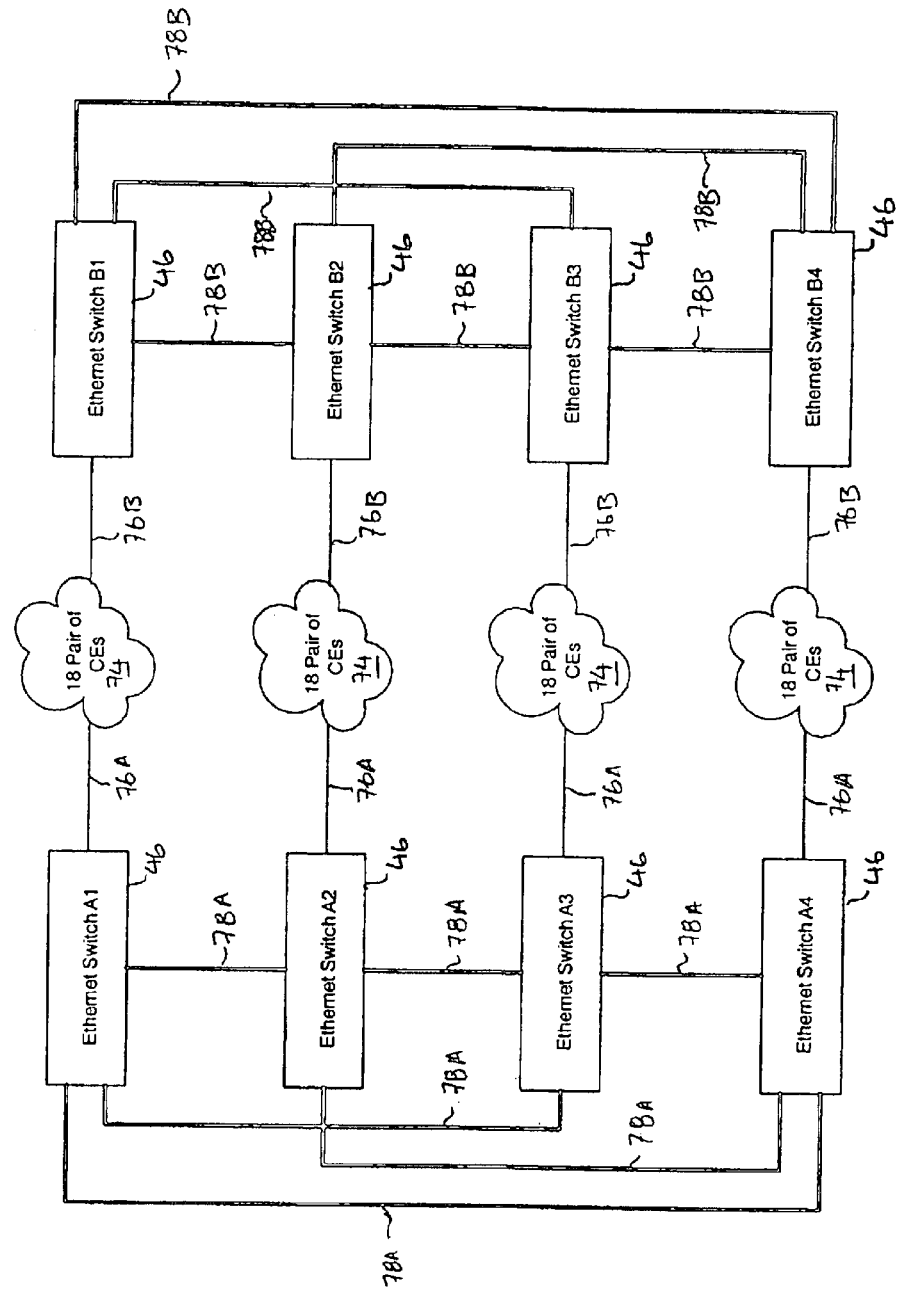

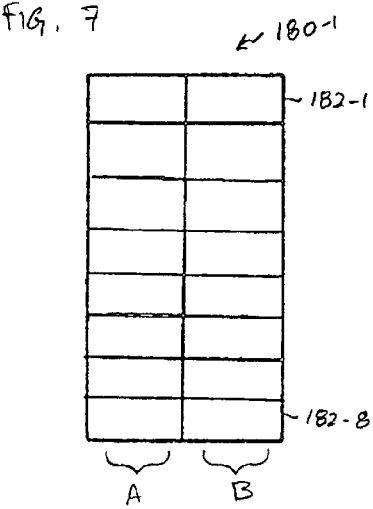
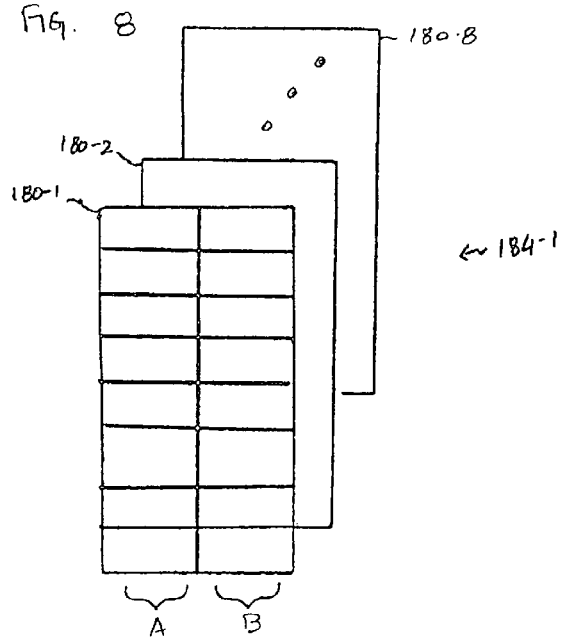
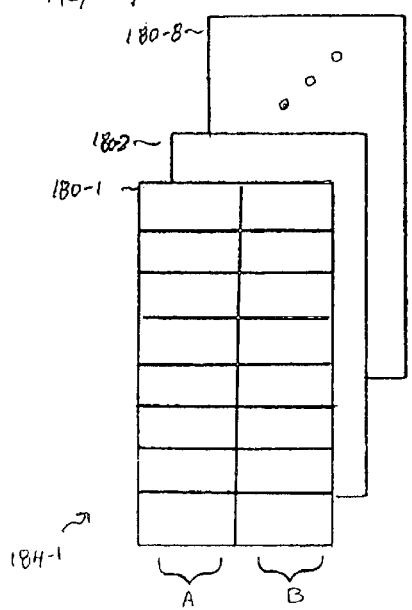
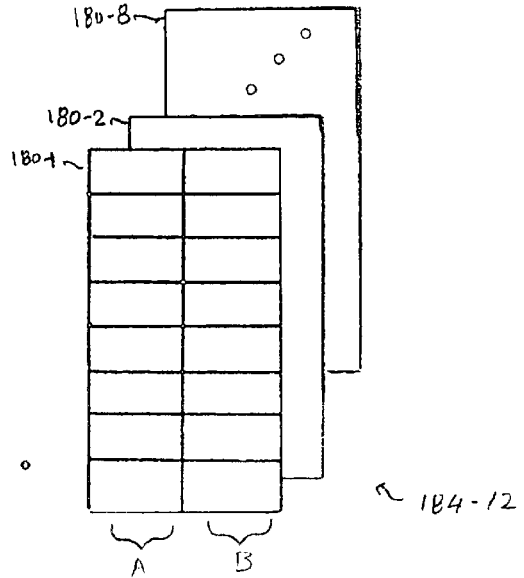

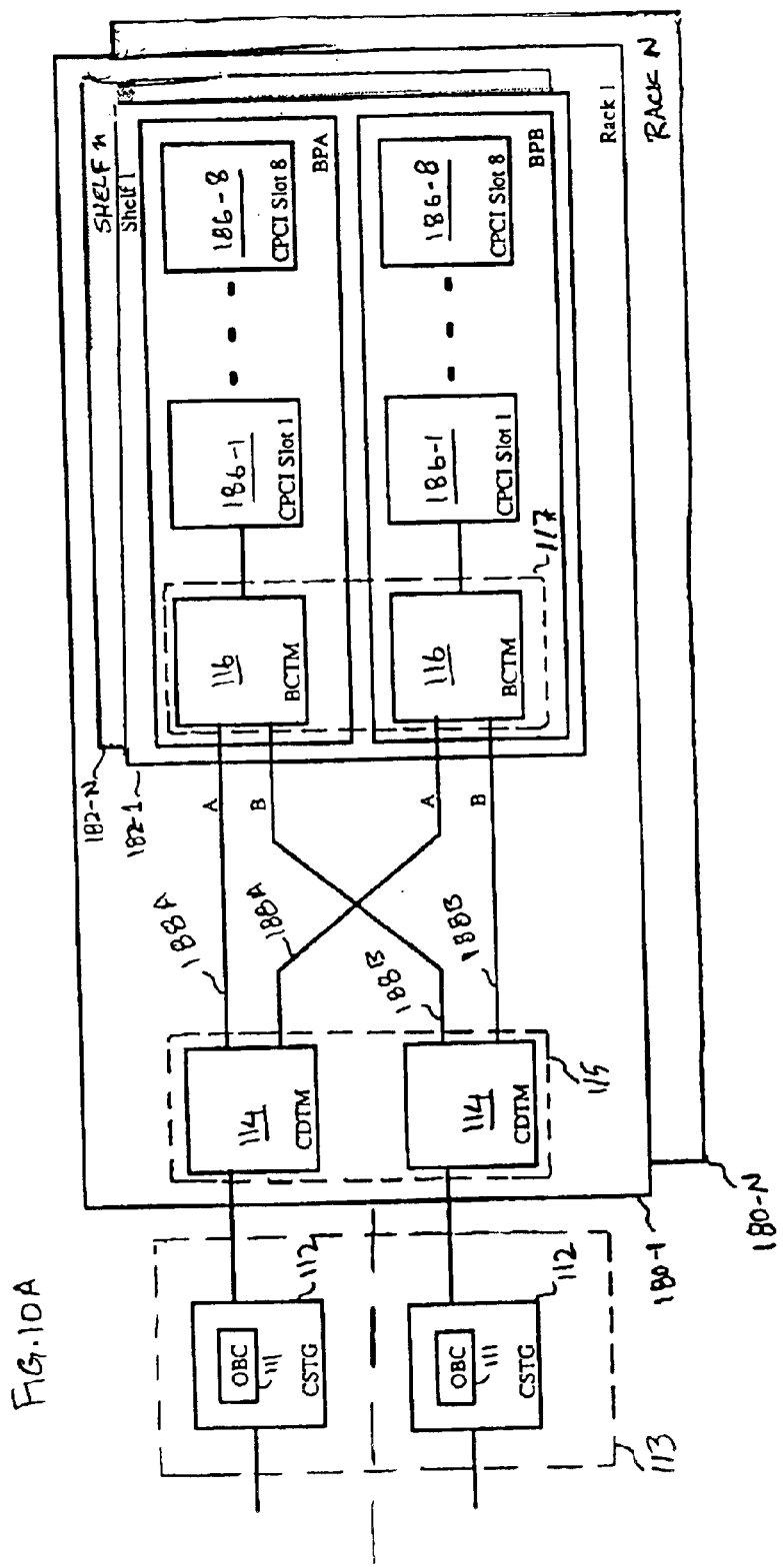

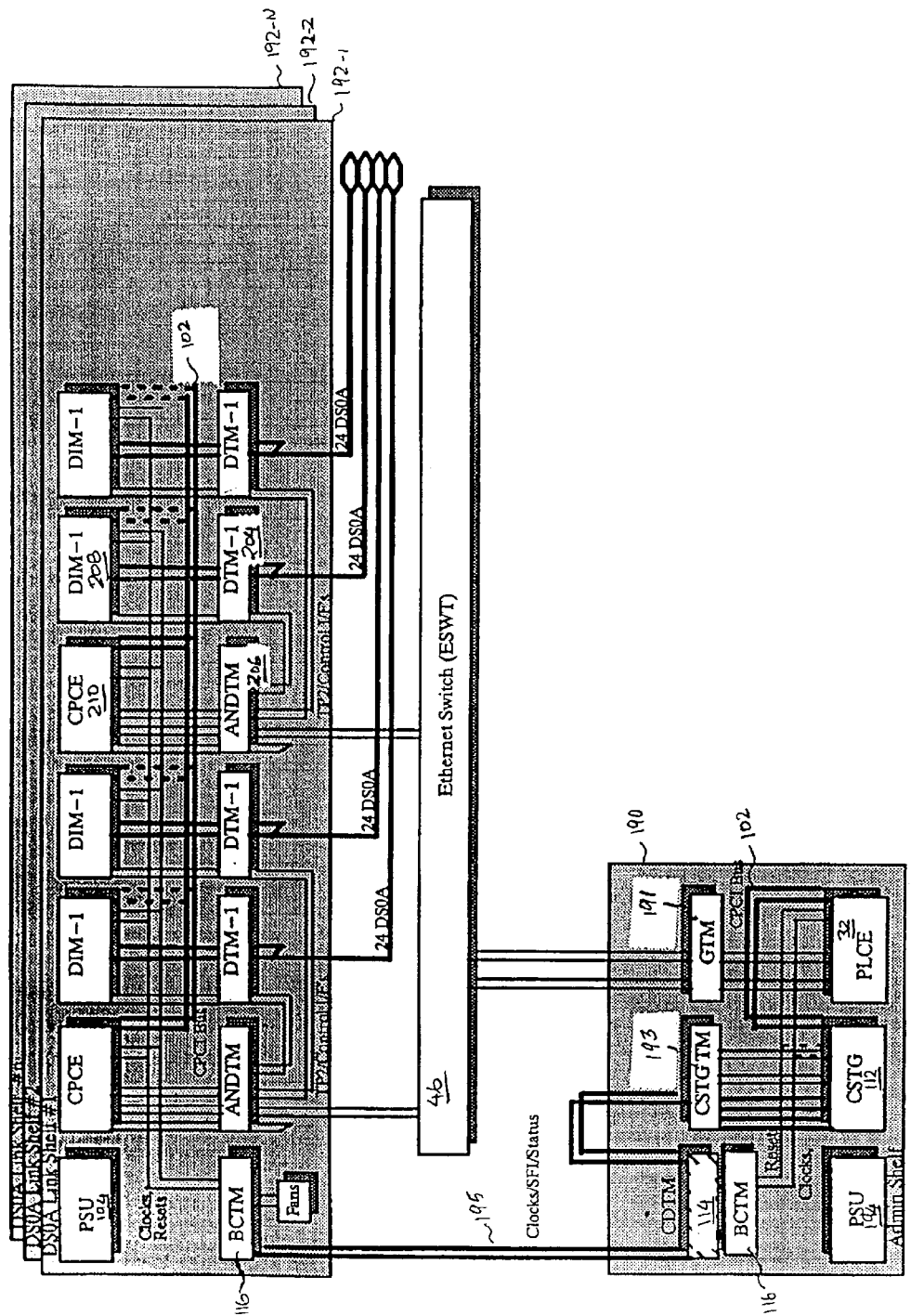

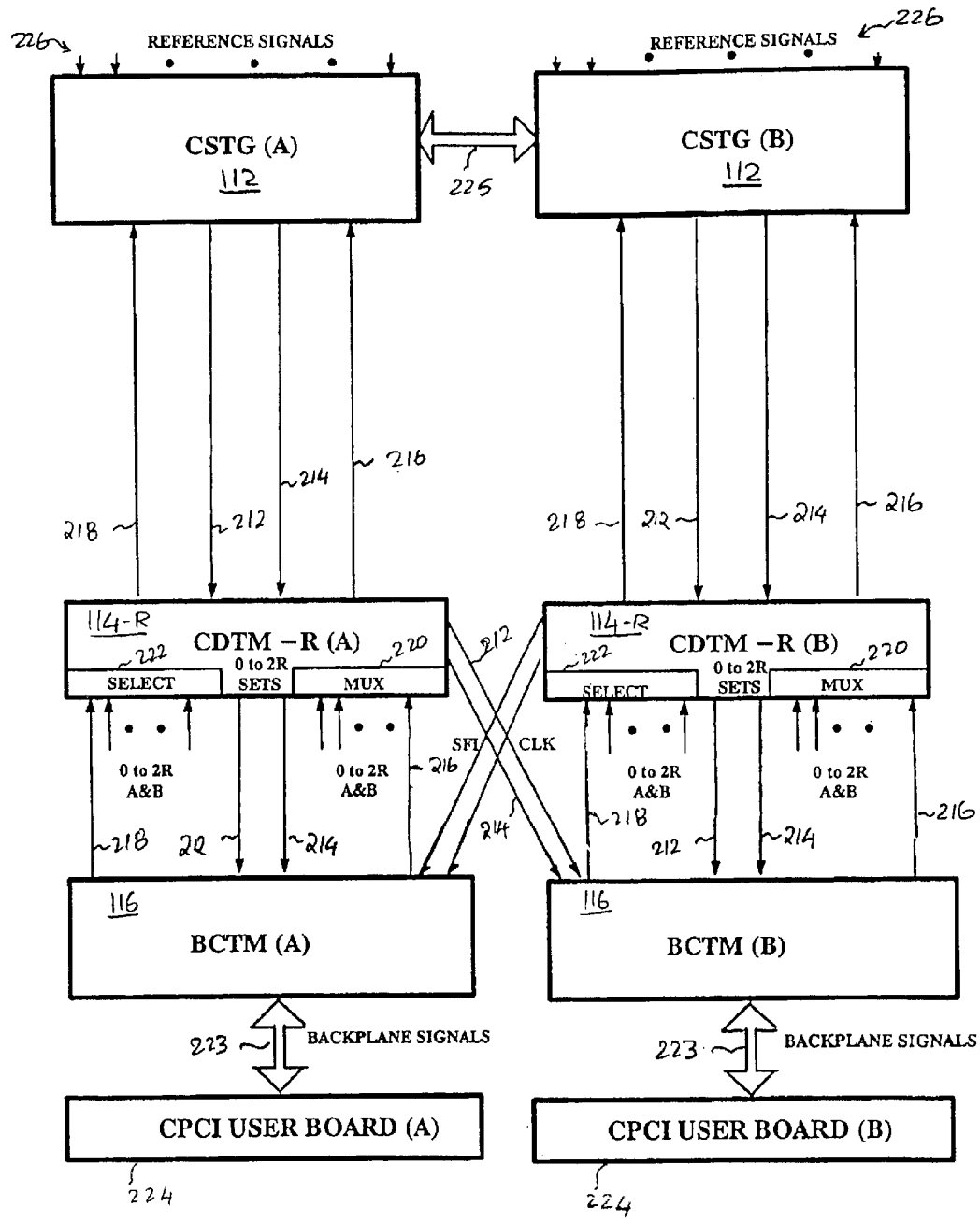

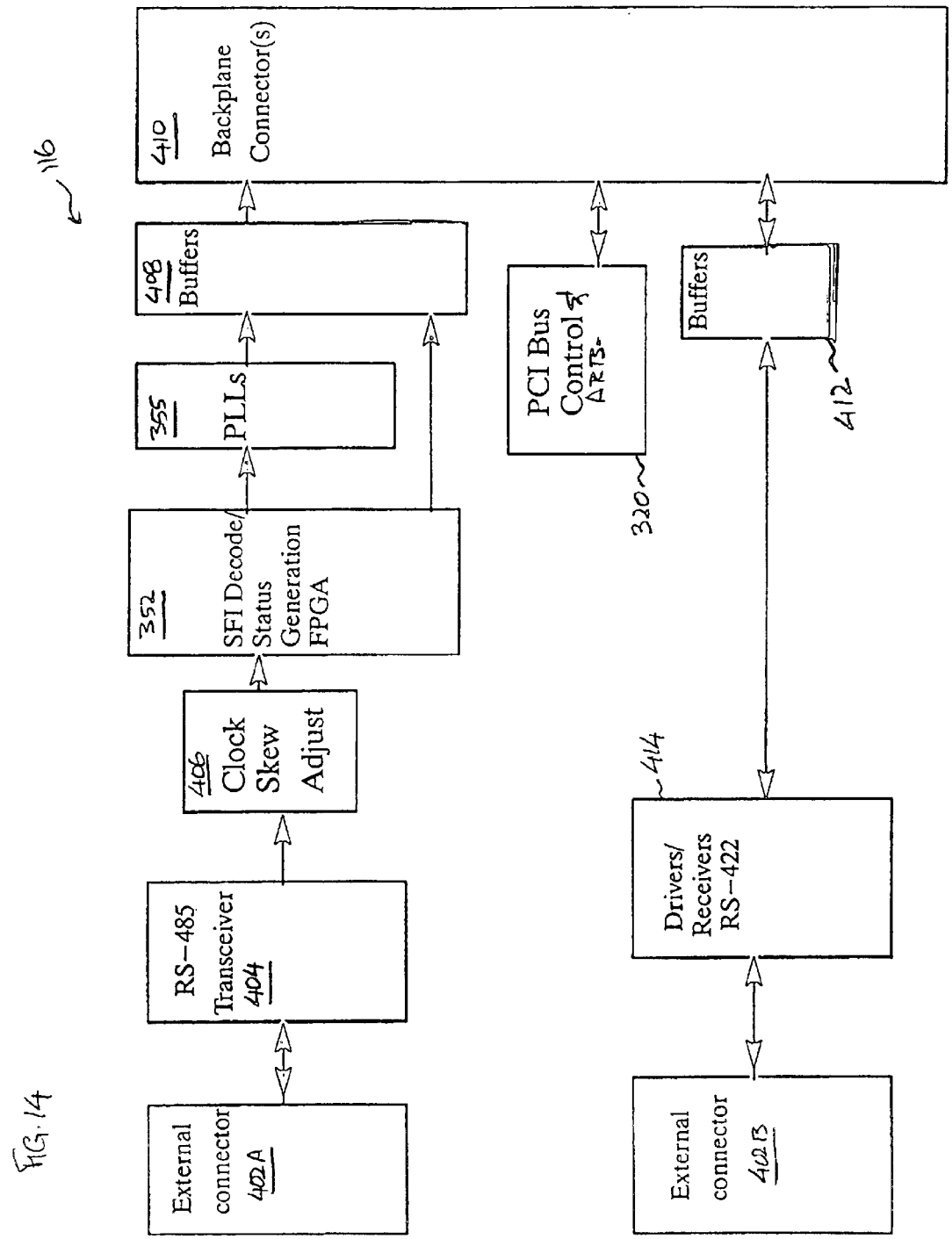

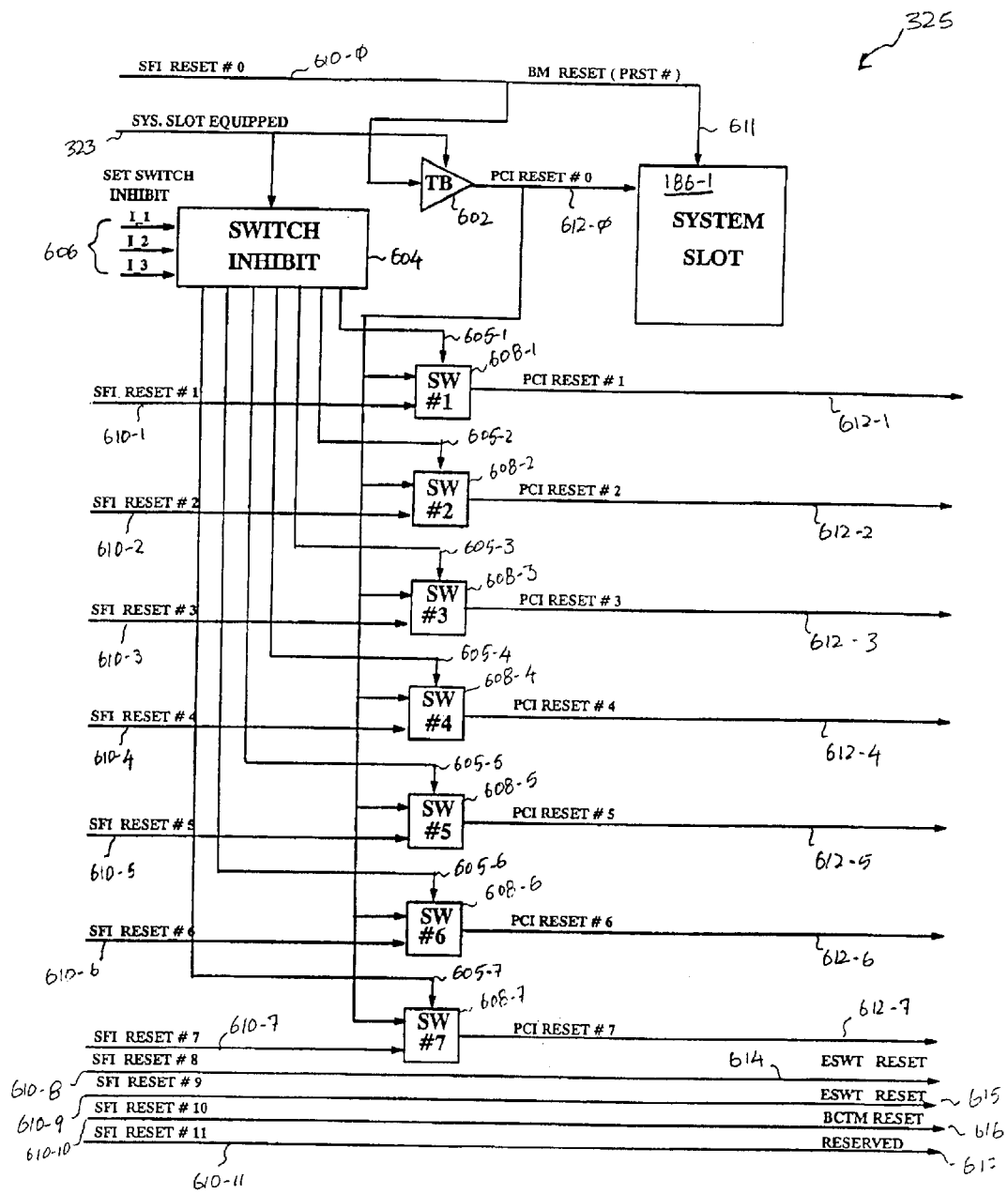

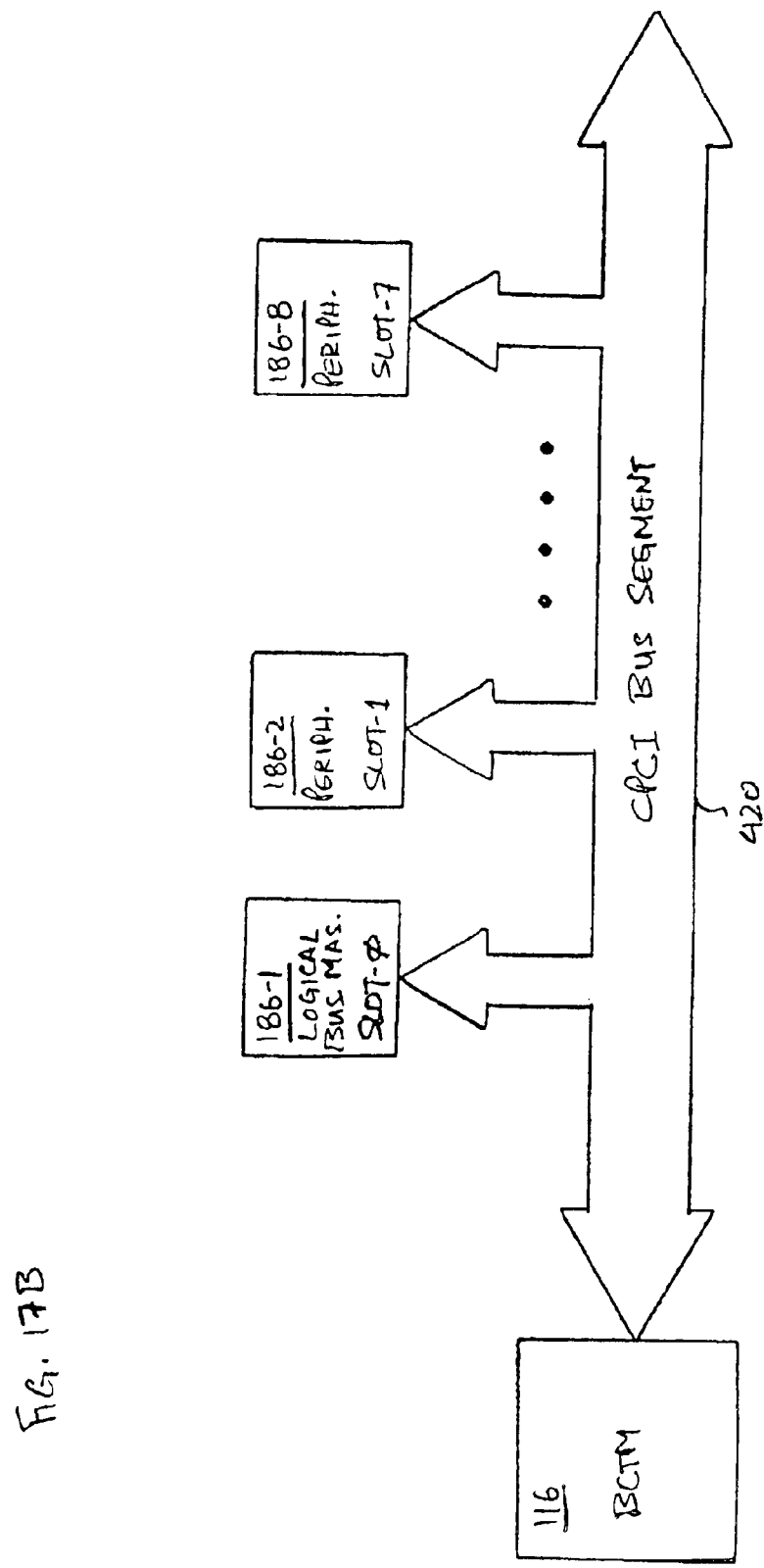

BUS CONTROL MODULE FOR A MULTI-STAGE CLOCK DISTRIBUTION SCHEME IN A SIGNALING SERVER

CROSS-REFERENCE TO RELATED APPLICATIONS

This application discloses subject matter related to the subject matter disclosed in the following co-assigned patent applications: (1) "Method and Apparatus for Routing Alarm Signals in a Signaling Server," filed Dec. 13, 2001 Ser. No. 10/020,619, in the name(s) of, Val Teodorescu; (2) "Card Design Having Tape and Disk Drives," filed Mar. 31, 2000 Ser. No. 09/539,759 now U.S. Pat. No. 6,636,917 issued Oct. 21, 2003, in the name(s) of: Ignacio Linares and Serge Fourcand; (3) "Clock Distribution Scheme in a Signaling Server," filed Mar. 31, 2000, Ser. No. 09/541,002 now U.S. Pat. No. 6,643,791 issued Nov. 4, 2003, in the name(s) of: Val Teodorescu: and (4) "Bus Control Module with System Slot Functionality in a Compact Peripheral Component Interconnect Bus System," filed Mar. 31, 2000, Ser. No. 09/540,594 now abandoned, in the name(s) of: Serge Fourcand, Curt McKinley, and Val Teodorescu.

BACKGROUND OF THE INVENTION

1. Technical Field of the Invention

The present invention relates to clock distribution and alarm collection schemes in telecommunications equipment and, more particularly, to a bus control module provided as a terminating stage in a multi-stage clock distribution and alarm collection system in a network platform (e.g., a Next Generation Signaling Transfer Point (STP)) for use in Signaling System No. 7 (SS7) networks.

2. Description of Related Art

Out-of-band signaling establishes a separate channel for the exchange of signaling information between call component nodes in order to set up, maintain and service a call in a telephony network. Such channels, called signaling links, are used to carry all the necessary signaling messages between the nodes. Thus, for example, when a call is placed, the dialed digits, trunk selected, and other pertinent information are sent between network switches using their signaling links, rather than the trunks which will ultimately carry the bearer traffic, i.e., conversation.

Out-of-band signaling has several advantages that make it more desirable than traditional in-band signaling. First, it allows for the transport of more data at higher speeds than multi-frequency (MF) outpulsing used in the telephony networks of yore. Also, because of separate trunks and links, signaling can be done at any time in the entire duration of the call, not just at the beginning. Furthermore, out-of-band signaling enables signaling to network elements to which there is no direct trunk connection.

SS7 packet signaling has become the out-of-band signaling scheme of choice between telephony networks and between network elements worldwide. Three essential components are defined in a signaling network based on SS7 architecture. Signal Switching Points (SSPs) are basically telephone switches equipped with SS7-capable software that terminate signaling links. They generally originate, terminate, or switch calls. Signal Transfer Points (STPs) are the packet switches of the SS7 network. In addition to certain specialized functions, they receive and route incoming signaling messages towards their proper destination. Finally, Signal Control Points (SCPs) are databases that provide information necessary for advanced call-processing and Service Logic execution.

As is well known, SS7 signaling architecture is governed by several multi-layered protocols standardized under the American National Standards Institute (ANSI) and the International Telecommunications Union (ITU) to operate as the common "glue" that binds the ubiquitous autonomous networks together so as to provide a "one network" feel that telephone subscribers have come to expect.

The exponential increase in the number of local telephone lines, mobile subscribers, pages, fax machines, and other data devices, e.g., computers, Information Appliances, etc., coupled with deregulation that is occurring worldwide today is driving demand for small form factor, high capacity STPs which must be easy to maintain, provide full SS7 functionality with so-called "five nines" operational availability (i.e., 99.999% uptime), and provide the capability to support future functionality or features as the need arises. Further, as the subscriber demand for more service options proliferates, an evolution is taking place to integrate Intelligent Network (IN)-capable SCP functionality within STP nodes.

While it is generally expected that a single platform that supports large-database, high-transaction IN services as well as high-capacity packet switching (hereinafter referred to as a signaling server platform) will reduce equipment costs, reduce network facility costs and other associated costs while increasing economic efficiency, those skilled in the art should readily recognize that several difficulties must be overcome in order to integrate the requisite functionalities into a suitable network element that satisfies the stringent performance criteria required of telecommunications equipment. Daunting challenges arise in designing a compact enough form factor that is efficiently scalable, ruggedized, and modularized for easy maintenance, yet must house an extraordinary constellation of complex electronic circuitry, e.g., processors, control components, timing modules, I/O, line interface cards which couple to telephony networks, etc., that is typically required for achieving the necessary network element functionality. Whereas the electronic components may themselves be miniaturized and modularized into cards or boards, interconnecting a large number of such cards via suitable bus systems and controlling such interconnected systems poses many obstacles.

Conventional bus masters (which manage a bus segment and the devices or cards disposed thereon) and bus master arrangements are beset with numerous deficiencies and drawbacks in this regard. In the existing arrangements, for example, the bus master occupies one of the fixed number of slots (i.e., system board slot) provided with the bus segment, thereby reducing the number of slots available for other cards, i.e., peripherals. Where peripheral connectivity is at a premium, such as a network element requiring a large number of line interface cards in a compact form factor, such a situation is undesirable.

Also, current bus master cards are typically based on a processing element for their functionality. Although processor-based bus masters possess "higher intelligence," such cards have less overall reliability because processors, as a class of electronic devices, have higher Failures per Billion Operating Hours (FITs) in general. Again, in stringent telecommunications environments, this reduced overall reliability poses an unacceptable risk of failure.

Furthermore, when processor-based bus masters are used in current arrangements, processors similar to bus master processors cannot be used for peripherals that are designed to contain processors. Two different types of hardware need to be maintained accordingly, which can also give rise to a reliability risk in addition to increased maintenance costs.

Where the use of non-standard system boards is desired in order to overcome the aforementioned deficiencies, typically in telecommunications equipment, such boards must be capable of operating effectively within the equipment's clock distribution scheme provided for distributing internal clock signals (i.e., telecommunication clocks) to the line interface cards. This is particularly applicable in systems required to provide tightly controlled telecommunication clocks in a reliable manner in highly scalable architectures which also include redundancy.

In addition, as those skilled in the art should readily appreciate, current techniques for collecting alarm and status data from a huge number of sources (typically the cards themselves) in telecommunications equipment are inadequate because they require running separate cables from each alarm source to a centralized controller of the system. Clearly, with thousands of cards that may be needed for achieving the necessary network element functionality, such an arrangement creates an unmanageable cabling problem with attendant potential reliability hazards. Moreover, such concerns are heightened when small form factor requirements are imposed.

SUMMARY OF THE INVENTION

Accordingly, the present invention is directed in one aspect to a bus control module (BCM) provided as a terminal stage in a multi-stage distribution system disposed in a signaling server which operates as a Signal Transfer Point in a telecommunications network. Decoding circuitry is included in the BCM to decode a framed control signal received from an upstream stage of the multi-stage distribution system which is used for controlling the operation of the BCM. A status generator is provided which receives as inputs a plurality of status signals from line interface cards disposed on a bus segment and controlled by the BCM. The status generator encodes the status signals in a predetermined frame or frames of a framed serial status bitstream based on control data obtained from the framed control signal. A Phase Lock Loop (PLL) module is included in the BCM to lock on an incoming system clock signal received from upstream in order that a copy of the system clock can be provided to each line interface card.

In another aspect, the present invention relates to a signaling server disposed in a telecommunications network which comprises a multi-stage clock distribution and alarm collection system to distribute a system clock to a plurality of line interface cards organized into one or several link shelves. An administrator shelf is provided for including circuitry for controlling the link shelves. Shelves are uniquely identified without resorting to hardwired strapping. The multi-stage distribution system includes a system timing generator (STG) disposed in the administrator shelf for generating a system clock at a predetermined frequency based a reference input. The STG also includes circuitry for producing a framed control signal which is used for effectuating a shelf ID assignment scheme and for controlling the system clock distribution based thereon. At least one level of clock distribution modules (CDMs) are coupled to the STG, wherein each CDM receives the system clock and the framed control signal. Circuitry is disposed in the CDMs for providing a fan-out of the system clock to a plurality of ports of the CDMs based on port address information contained in the framed control signal and the level of the CDMs, wherein at least one of the CDMs comprises a rack-level CDM. A plurality of BCMs are coupled to the rack-level CDM. Each BCM interfaces with at least a portion of the line interface cards and provides a copy of the system clock received from the rack-level CDM to each of the line interface cards based on the framed control signal.

BRIEF DESCRIPTION OF THE DRAWINGS

A more complete understanding of the present invention may be had by reference to the following Detailed Description when taken in conjunction with the accompanying drawings wherein:

FIGS. 5A and 5B illustrate two scalable, redundant interconnect (switch fabric) architectures of an exemplary signaling server of the present invention;

FIGS. 7–9 depict modularized, scalable form factors for housing the signaling server functionality of the present invention;

FIG. 10A depicts an exemplary three-stage clock/alarm distribution scheme with the BCM of the present invention;

FIG. 10B depicts an exemplary shelf arrangement interconnecting scheme between a link shelf and an administrative shelf of the modularized signaling server's rack wherein the placement of a clock distribution module (CDM) card and a BCM card used for clock distribution and alarm collection is illustrated;

FIGS. 12A–12C depict another set of views of the three-level, three-stage clock/alarm distribution scheme illustrating the cascaded clock, control and Status signals in a redundant architecture;

FIG. 14 depicts a simplified hardware block diagram of the BCM of the present invention;

FIG. 16 depicts an exemplary reset distribution scheme used by the BCM in accordance with the teachings of the present invention; and FIGS. 17A–17C depict three exemplary arrangements wherein the BCM card of the present invention is advantageously employed in relation to a plurality of slots disposed on a CPCI bus segment for controlling Printed Board Assemblies (PBAs) positioned therein.

DETAILED DESCRIPTION OF THE DRAWINGS

Figure 1:
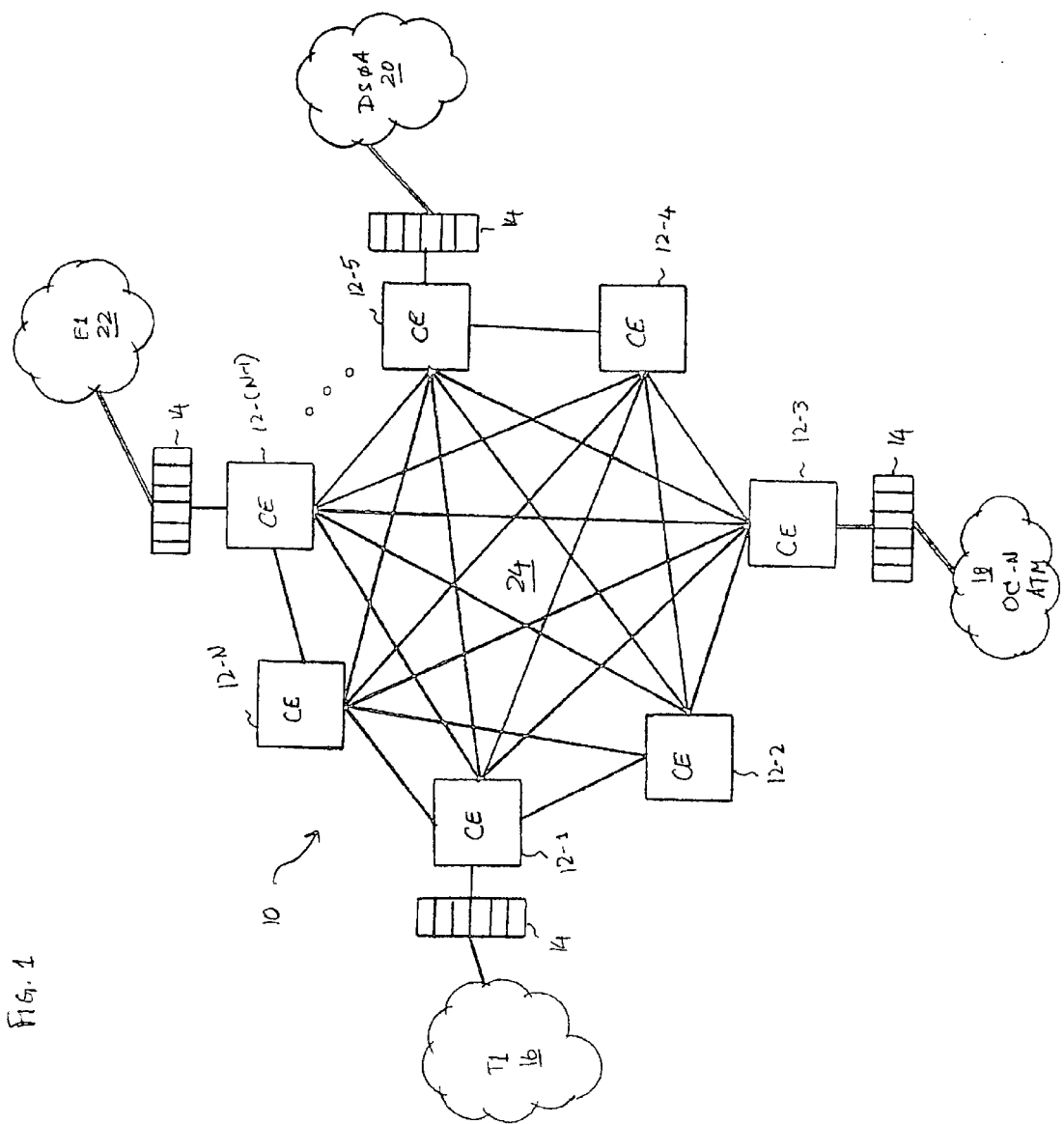
FIG. 1 depicts a high-level architectural view of a signaling server wherein a clock/alarm distribution scheme having a bus control module (BCM) provided in accordance with the teachings of the present invention may be advantageously deployed.

In the drawings, like or similar elements are designated with identical reference numerals throughout the several views thereof, and the various elements depicted are not necessarily drawn to scale. Referring now to FIG. 1, depicted therein is a high-level architectural view of a telecommunications network node disposed in a heterogeneous network environment, e.g., a signaling server 10 having enhanced STP functionality, wherein a multi-stage clock/alarm distribution system having a bus control module (BCM) provided in accordance with the teachings of the present invention may be advantageously utilized. The signaling server 10 is preferably based on a distributed architecture of loosely coupled computing/control elements (CEs) or processors, e.g., reference numerals 12-1 through 12-N, networked together via a high-speed switching fabric 24. Each processor performs discrete functions in the control and maintenance of particular devices (not shown in this FIG.) and in the control of signaling, administrative, and/or maintenance functions. For example, one or more CEs are responsible for controlling the interfacing with the heterogeneous telecommunications network environment within which the signaling server 10 is disposed for providing the signaling/switching services. In the exemplary architecture shown in FIG. 1, a T1 network 16 operating at 1.544 megabits per second (Mbps) (equivalent to 24 voice channels) is linked to the signaling server 10 via a plurality of ports 14 controlled by CE 12-1. Similarly, an Asynchronous Transfer Mode (ATM) network 18 capable of operating at a particular rate, e.g., Optical Carrier (OC)-3, OC-12, OC-48, OC-N etc., is linked to the signaling server 10 via ports 14 controlled by CE 12-3. In analogous fashion, a DS-0A network 20 operating at 64 kilobits per second (Kbps) and an E1 network 22 operating at 2.048 Mbps are also exemplified herein. It should be apparent to those skilled in the art that networks operating with other standards and protocols, e.g., Synchronous Optical Network (SONET) and its companion Synchronous Digital Hierarchy (SDH), Internet Protocol (IP), etc., may also be linked to the signaling server 10 in certain implementations.

Figure 2:
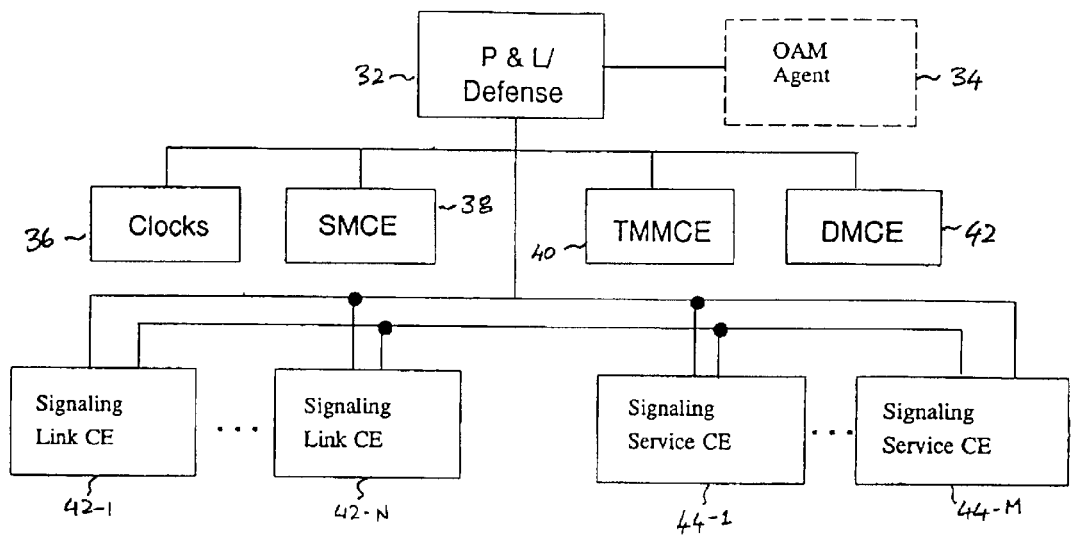
FIG. 2 depicts a functional block diagram of an exemplary embodiment of a signaling server.

FIG. 2 depicts a functional block diagram of an exemplary embodiment of the signaling server 10 wherein the plurality of CEs are grouped together based on their functionality as follows: Peripheral and Load CEs (PLCE) 32 coupled to an Operations, Administration and Maintenance (OAM) Agent 34 which is responsible for performing Operation Support System (OSS) interfaces; Signaling Management CEs (SMCE) 38; Database Management CEs (DMCE) 42; Traffic Metering and Measurement CEs (TMMCE) 40; and, depending upon the number of network link interfaces and their type, a plurality of Signaling Link CEs (SLCE) 42-1 through 42-N and a plurality of Signaling Service CEs (SSCE) 44-1 through 44-M. A plurality of clocks 36 are also provided under the control of PLCE 32 for furnishing the various time base signals required for the operation of the signaling server.

The PLCE 32 is provided as the logical master CE of the signaling server and controls the following functionality:

System initialization and loading: Provides loading segment sources upon power-up for all processors and devices of the system, except for the OAM Agent 34 and a Local Service Control Point (not depicted in FIG. 2);

Command handlers: Processes user commands (i.e., commands generated by the SS7 network operator that operates and maintains the signaling server) and dispatches them to proper subsystems;

Centralized configuration management: Provides maintenance processing on processors and devices;

Centralized fault handling: Receives and processes faults detected in the signaling server system. Coordinates with configuration management to remove faulty devices from the system;

Centralized test management: Processes all test requests for processors and devices. Coordinates between different processors/devices for tests that span multiple devices;

Event reporting: Handles processing events output to the user;

Alarm handling: Processes alarms presented to the user;

Core/Crash management: Processes data from processor crashes;

Clock management: Controls the system timing generator (s) (STG) which are responsible for generating appropriate system clock and control signals used in the multi-stage clock distribution scheme wherein the BCM of the present invention is utilized as a terminating stage interfacing with line cards; and System Alarm Card: Sends alarm information to customer equipment.

The OAM Agent 34 operates in conjunction with the PLCE 32 as a co-master of the signaling server system and shares the OAM functionality therewith. The OAM Agent 34 is responsible for providing user interfaces (preferably Web-based graphic user interfaces) and includes local service management, reset controller management, No. 2 Switching Control Center System (SCCS) functionality, and Signaling Engineering and Administration System (SEAS) functionality.

Continuing to refer to FIG. 2, the TMMCE 40 contains a centralized collection mechanism for all measurements data collected in the signaling server system. The SMCE 38 manages the SS7 subsystem which comprises the following: SS7 route management; SS7 traffic management; SS7 provisioning; and Signaling Connection Control Part (SCCP) management. Each SLCE (e.g., reference numeral 42-1) controls SS7 link hardware and contains up to and through Message Transfer Part (MTP) Level 3 and SCCP functionality. The SLCE is responsible, accordingly, for the following: MTP Levels 2 and 3; SS7 link management; SCCP with Global Title Translation (GTT); and gateway screening.

The SSCE (e.g., SSCE 44-1), which controls no SS7-related hardware, contains logical database and screening service functionality for the SS7 subsystem. Its functionality includes: Local Number Portability (LNP) services; SCCP with GTT; gateway screening; and MTP buffering and routing. The DMCE 42 also controls no SS7-related hardware and provides the LNP and Application Location Register (ALR) functionality for the SSCEs.

Figure 3:
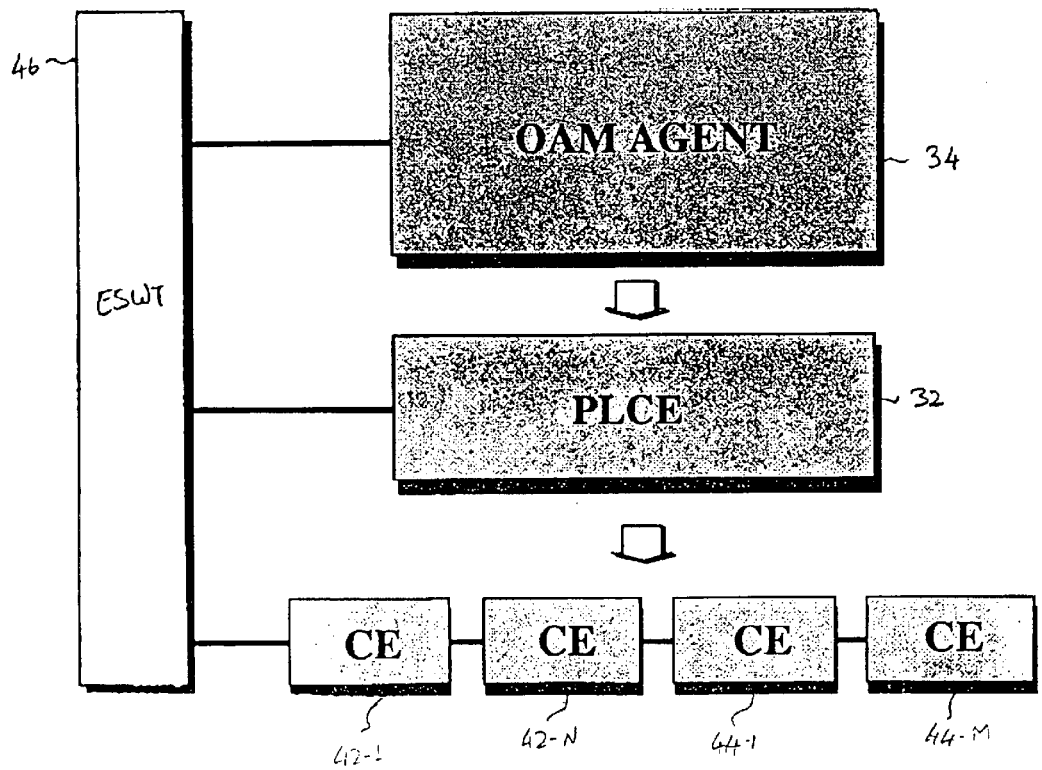
FIG. 3 depicts a hierarchical functional block diagram of an exemplary embodiment of a signaling server.

Referring now to FIG. 3, depicted therein is a hierarchical functional block diagram of a presently preferred exemplary embodiment of the signaling server which uses a high-speed Ethernet switching fabric (ESWT) 46 for internal transport among the various CE components described in greater detail hereinabove. The OAM Agent 34 and PLCE 32, which share the system master functionality, control the remaining CEs of the system wherein each CE runs a copy of Operating System Nucleus (OSN) for performing its assigned functionality.

Figure 4:
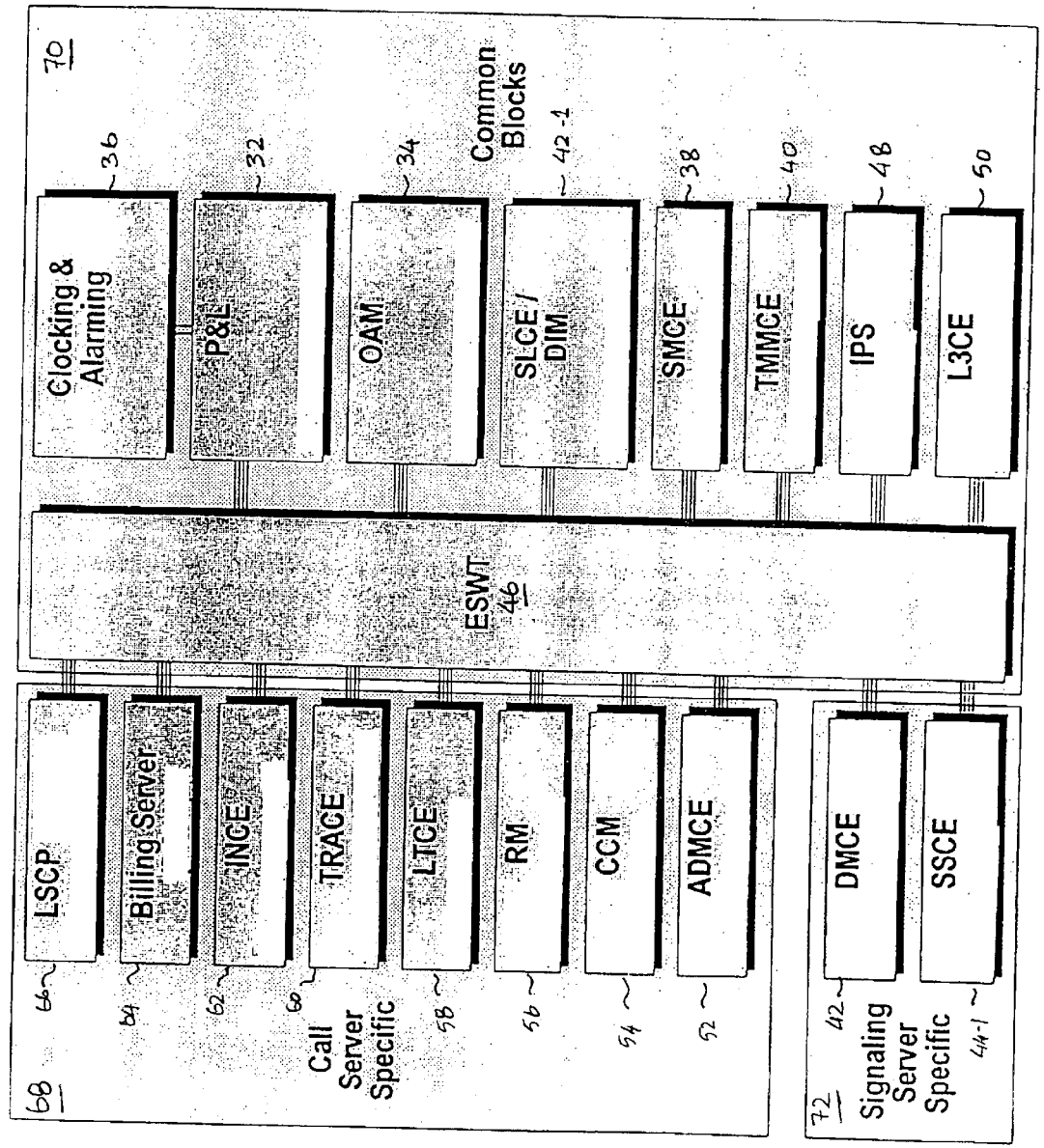
FIG. 4 depicts a functional block diagram of another exemplary embodiment of a signaling server having additional functionality.

FIG. 4 depicts a functional block diagram of another presently preferred exemplary embodiment of the signaling server which includes a Local Service Control Point (LSCP) 66 for locally providing a suitable Service Logic environment with respect to subscriber services, as well as a plurality of functional blocks to provide call server functionality. As can be readily seen in this FIG., the enhanced functionality of the signaling server node comprises a call-server-specific block 68, a signaling-server-specific block 72, and a common functional block 70 which comprises the CE components set forth above in addition to an IP signaling node (IPS) 48 and a separate MTP Level 3 Control Element 50.

The call-server-specific block 68, which provides basic call setup/control and local services, includes the following: LSCP 66, a billing server 64, an Intelligent Network Control Element (INCE) 62, a Trunk Resource Allocator Control Element (TRACE) 60, a Line/Trunk Control Element (LTCE) 58, a Resource Manager (RM) 56, a Connection Control Manager (CCM) 54, and an Administration Control Element (ADMCE) 52.

Figure 5A:
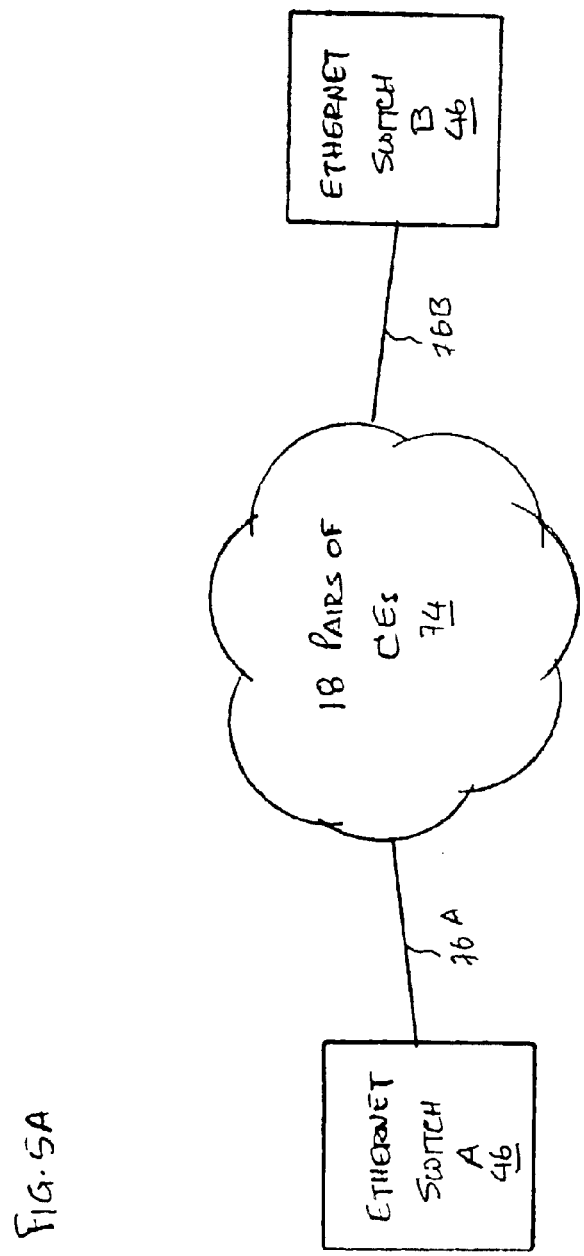

FIGS. 5A and 5B illustrate two scalable Ethernet switch fabric architectures having redundancy for providing the signaling server's internal messaging backbone. Preferably, the Ethernet switches 46 are capable of providing full wireline switching at 100base-T speed. As exemplified in the basic configuration depicted in FIG. 5A, the switching network 46 comprises two separate switching fabrics, an A-side fabric and a B-side fabric, in order to support full redundancy. Each CE in the CE constellation 74 (forming the signaling server's functional blocks set forth hereinabove) is provided with two 100 Mbps Ethernet connections, one on the A-side and the other on the B-side of the switching network.

In the basic configuration of FIG. 5A, two Ethernet switches are provided which can connect up to a maximum number of CEs based on the number of ports available on each Ethernet switch. For example, if each switch has 36 ports, then a maximum raw connectivity for 36 CEs (or 18 pairs of CEs) is available. The connection paths 76A and 76B exemplify the 100 Mbps links between the Ethernet switch ports and CEs.

Larger configurations of the signaling server are accomplished by adding more Ethernet switches into each side of the switching network, thus providing additional CE connectivity. Further, each switch in the internal switching network is preferably connected to every other switch using a gigabit link (1 Gbps or 1000 Mbps). FIG. 5B exemplifies a switching fabric for connecting 144 CEs (or 72 pairs) using four pairs of 36-port Ethernet switches. The inter-switch gigabit links are exemplified by six connection paths 78A on the A-side of the switching fabric and six connection paths 78B on the B-side of the switching fabric.

Figure 6:
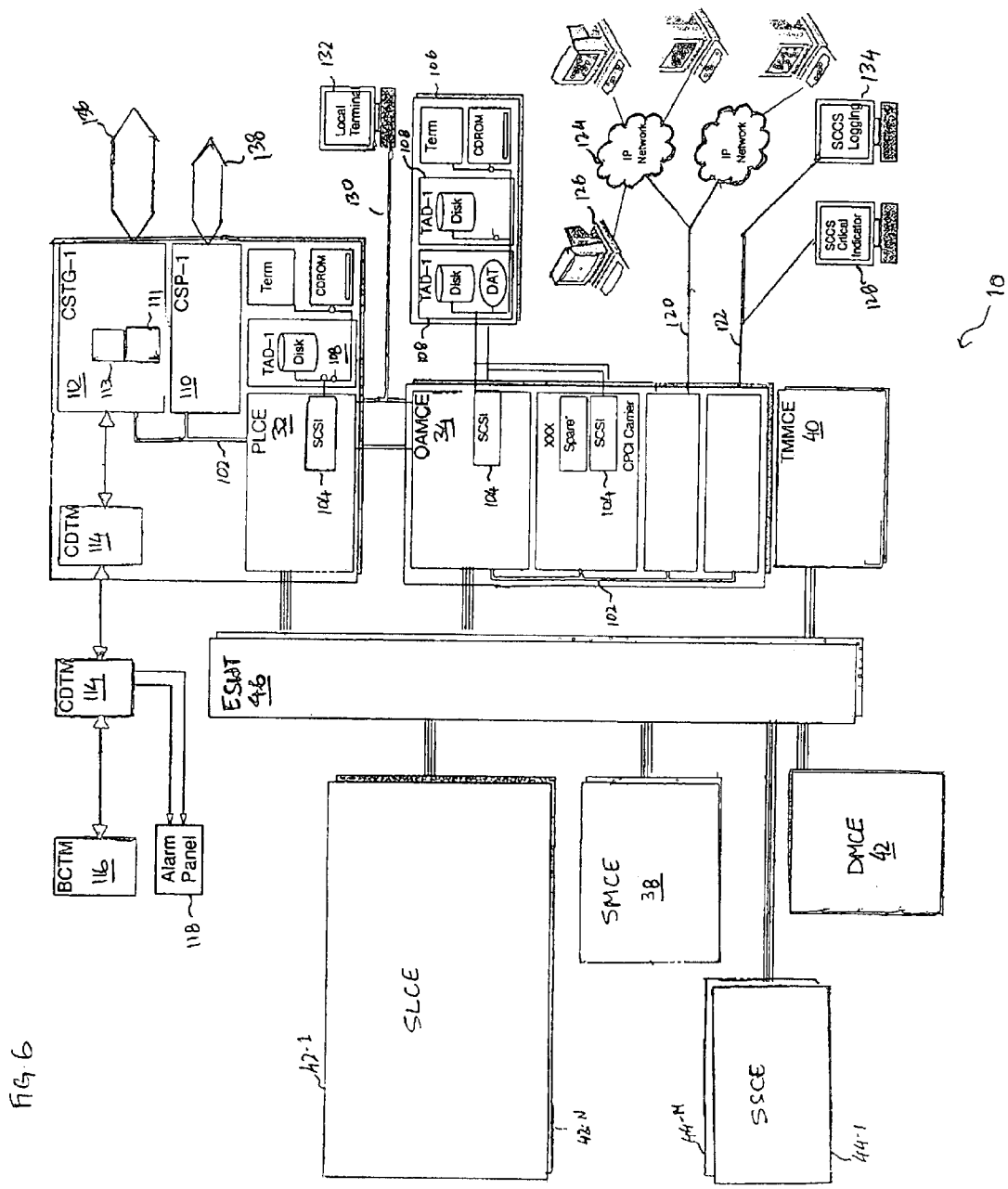
FIG. 6 depicts a hardware architectural block diagram of an exemplary signaling server including a multi-stage clock/alarm distribution system which includes a BCM as a terminating stage in accordance with the teachings of the present invention.

FIG. 6 depicts a hardware architectural block diagram of a presently preferred exemplary embodiment of the signaling server 10 which includes a multi-stage clock distribution system having a terminal stage BCM in accordance with the teachings of the present invention. The signaling server's CE components such as SLCE 42-1 through 42-N, SMCE 38, SSCE 44-1 through 44-M, TMMCE 40, OAMCE 34, PLCE 32, and DMCE 42 are connected to the redundancy-based Ethernet switching fabric 46 as explained hereinabove. A plurality of computers, e.g., PC 126, are coupled to the OAMCE 34 via a suitable IP network 124 and IP-compatible path 120 for providing Web-based user interfacing with the signaling server with respect to the SEAS and SCCS functionality. Similarly, SCCS terminals 128 and 134 are coupled to the OAMCE 34 via an RS-232 path 122. One or more Small Computer System Interface (SCSI) modules 104 are included in the OAMCE block 34 for preferably providing connectivity to a plurality of I/O cards 106 having tape and disk (TAD) modules 108.

A SCSI module 104 is also included in the PLCE block 32 for providing connectivity to associated TAD module 108. A Control and Sense Point (CSP) 110 is coupled to the PLCE component 32 for providing the capability to receive and process customer alarm control points and alarm sense points via interface 138. A system timing generator (STG) module 112 having a clock 113 of a particular Stratum stability standard and an on-board computer (OBC) 111 is coupled to the PLCE component 32. The STG module 112 forms the first stage of the multi-stage clock distribution system for generating an internal system clock of a particular frequency that is transported to the line interface cards of the signaling server. Preferably, the STG module 112 receives a plurality of external reference clocks and generates appropriate composite clock outputs via a signal interface 136. Further, as the apex stage of the multi-stage clock/alarm distribution system, the STG module 112 also receives aggregated system alarms and Status signals from lower stages.

A clock distribution module (CDM) 114 coupled to the STG module 112 is provided as the distribution point (second stage) in the multi-stage clock distribution system. Multiple levels of CDMs may be provided in a cascaded chain for performing the clock distribution function depending on the size of the signaling server 10. Essentially, the CDM 114 receives its system clock input from the STG module 112 and generates a predetermined number of copies of the same so as to drive them to the downstream modules in the cascaded chain. Further, the CDM module receives a framed control signal called Super Frame Jig Indicator (SFI) signal from the STG module 112 which is encoded along the cascaded chain for controlling the proper distribution of clock signals, and for collecting alarm signals and Status information from lower levels of the system.

In addition to the clock distribution function, the CDM 114 commands and controls a system alarm panel 118 which provides visual and audible indicators for preferably three types of alarms: critical, major, and minor. The alarm panel 118 is controlled by the PLCE component 32 via memory-mapped I/O operations to the STG 112. The alarm functionality information is placed in appropriate fields of the SFI signal and transferred to the CDM 114, which is then extracted to drive the audible/visual alarm indicators.

The CDM 114 is connected to a BCM 116 downstream which forms the third stage in the multi-stage clock distribution system in accordance with the teachings of the present invention. As will be described in greater detail hereinbelow, the BCM 116 receives its clock inputs from the upstream CDM 114 and, as part of the redundancy scheme, its mate on that level. The BCM 116 then selects one of the two clock inputs and distributes a copy of the clock to a plurality of boards or Printed Board Assemblies (PBAs) it controls on a bus backplane.

Those skilled in the art should realize upon reference hereto that the various CE blocks and associated devices described hereinabove may be advantageously provided as highly modularized PBAs disposed on a suitably segmented high performance bus system that affords a rugged mechanical form factor in addition to hot swappability, to increase system reliability and availability. Accordingly, the Compact Peripheral Component Interconnect (CPCI) standard which has emerged as the bus system of choice for ruggedized applications requiring stringent form factors while still maintaining electrical compatibility with the PCI bus standard in terms of its high performance, is preferably utilized for interconnecting the various PBAs of the signaling server. As is well known, although the CPCI standard is identical to the PCI standard used in PCs in terms of electrical performance, it offers a more connectorized card form factor and uses a vertically mounted backplane that is not only highly robust, but also provides access from both sides of the backplane. Furthermore, in addition to facilitating the mechanical aspects of live insertion/removal of cards quickly and efficiently (i.e., hot swappable), the vertical layout provides for better cooling in the backplane chassis, an essential consideration in heat intensive applications.

Still continuing to refer to FIG. 6, a CPCI bus segment 102 is therefore preferably provided as the interconnect means between the various components of the OAMCE block 34 and between the PLCE 32 and STG 112. Because the various hardware components of the clock distribution scheme are provided as CPCI-compatible boards or cards, their nomenclature may be suitably modified to reflect this condition. For example, the STG 112 may be interchangeably referred to as CPCI STG or CSTG hereinafter. Moreover, as the CPCI standard allows for efficient connecterization utilizing both the front and back of a backplane to attach multiple components, the CDMs and BCMs of the clock distribution scheme are preferably provided as the rear panel boards known as transition modules (TMs). Accordingly, hereinafter, the CDM 114 may be interchangeably referred to as Clock Distribution Transition Module (CDTM) and the BCM 116 as Bus Control Transition Module (BCTM).

As briefly alluded to in the foregoing, the CDM/CDTM stage which forms the second stage of the multi-stage clock distribution scheme may be provided as a multi-level clock distribution point based on the size of the signaling server 10. It should be apparent to those skilled in the art that the signaling server's size is typically contingent upon the number of telecommunications network links it is designed to service in addition to the volume/type of signaling loads received thereat. Accordingly, the hardware architecture of the signaling server 10 is preferably provided to be scalable and redundant. Furthermore, the housing frame of the signaling server which is highly modularized for easy maintenance is amenable to clustering several basic housing units in inter-connected groups operating together as a single signaling server node.

FIGS. 7–9 depict three exemplary hierarchical levels of clustering used for expanding the signaling server's capacity. A single rack 180-1 illustrated in FIG. 7 exemplifies the basic housing frame design of the signaling server. The rack 180-1 is preferably compartmentalized into a plurality of sub-racks or shelves that house various CE components (hereinafter also referred to as CPCI CE components or CPCEs), line/link interface modules (LIMs) such as, e.g., DS-0A interface modules (DIMs), clock distribution components, and numerous associated devices and units, e.g., Power Supply Units (PSUs), fans, TAD boards, etc., all in modularized PBAs disposed on CPCI backplane connectors. In a presently preferred exemplary rack embodiment, eight shelves/sub-racks are provided which are labeled with reference numerals 182-1 through 182-8. In addition, it is envisaged that the signaling server functionality and associated hardware is partitioned among the various shelves such that some of the shelves may have specialized roles. For example, the administrative functionality of the signaling server may be conveniently packaged in the top shelf of the rack and accordingly may be referred to as the ADMIN Shelf. In similar fashion, shelves dedicated to providing the link interface functionality may be referred to as link shelves.

Further, each shelf of the rack 180-1 is segregated into an A-side and a B-side (referred to as half-shelves) to house redundant portions of the allocated hardware in order to increase reliability and interoperability of the system. Each half-shelf contains a CPCI backplane which preferably provides eight 6U/4HP (horizontal pitch) slots fully connectorized through P1 through P5 connectors on the front side as well as the rear panel TM side. A single BCM (or BCTM) card is provided in each half-shelf for distributing the clock signals to the PBAs disposed in the backplane slots. Additional features of the BCM functionality and architecture provided in accordance with the teachings of the present invention will be set forth in greater detail hereinbelow.

A single pair of CDTM cards which are connected to a pair of CSTGs are provided in the leading shelf (i.e., ADMIN shelf) of the rack 180-1 to provide the clock signals to the eight pairs of the BCTM cards. This pair of CDTMs comprises the lowest level in the multiple levels of the CDTM stage of the clock distribution scheme and are referred to as Rack level distribution CDTM cards or R-CDTM (or CDTM-R) cards.

Referring now to FIG. 8 in particular, a multi-rack configuration or cluster 184-1 is depicted therein. Preferably, the cluster 184-1 comprises eight racks, labeled with reference numerals 180-1 through 180-8, each of which is compartmentalized into A- and B-sides as set forth above with reference to rack 180-1. In addition to a pair of RCDTM cards in the leading shelf of each rack, the leading rack (e.g., rack 180-1) also contains a second pair of CDTMs to distribute the clock and SFI signals generated by the CSTG pair. This second pair of CDTMs comprises the middle level of the CDTM distribution stage of the clock distribution scheme and are referred to as Lead level distribution CDTM cards or L-CDTM (or CDTM-L) cards. In a presently preferred exemplary embodiment of the clock/alarm distribution system, the CDTM-L pair accordingly provides a clock fan-out for eight CDTM-R cards.

FIG. 9 depicts a multi-cluster, multi-rack configuration of the signaling server of the present invention which utilizes a third level of CDTMs, called Central Clock distribution level CDTMs or C-CDTMs, for providing a clock fan-out for twelve clusters (reference numerals 184-1 through 184-12) of eight racks each. Accordingly, in a presently preferred exemplary of the present invention, up to 96 racks—each rack containing four shelves (i.e., four pairs of BCTMs)—are provided with appropriate clock signals by utilizing the multi-stage clock distribution scheme. Furthermore, the cascaded CSTG-CDTM-BCTM chain is also advantageously utilized for collecting and multiplexing alarm/Status signals emanating from individual PBA boards residing in the shelves.

Referring now to FIG. 10A, depicted therein is an exemplary embodiment of the three-stage clock distribution system set forth above. The CSTG pair 112 (primary and secondary CSTGs) comprises the first stage 113 of the chain which supplies the system clock and SFI signals to the CDTMs 114 forming the second stage 115. As those of ordinary skill will readily recognize, the second stage 115 is provided in this exemplary embodiment as the lowest level CDTMs, i.e., the R-CDTMs, although it may comprise multiple levels depending upon the signaling server's size as explained in the foregoing portion of the Detailed Description. The R-CDTMs are directly connected to the third stage 117 of the clock distribution chain which is comprised of the BCTM cards 116, wherein each BCTM is responsible for local clock distribution with respect to eight CPCI slots 186-1 through 186-8 (slot-1 to slot-8 or, interchangeably, slot-0 to slot-7 or slot #0 to slot #7) residing in the half shelf it controls. Further, each BCTM card terminates two redundant timing distribution planes, 188A and 188B, received from the R-CDTMs 114, as will be explained in greater detail hereinbelow.

Multiple levels of the CDTM cards may be provided in the second stage 115 of the clock distribution scheme as follows:
  one rack: one pair of R-CDTM cards installed in the leading shelf;
  up to and including eight racks: one pair of L-CDTM cards installed in the leading rack and up to eight pairs of R-CDTMs; and
  more than eight racks: one pair of C-CDTM cards, up to 12 pairs of L-CDTM cards, and up to 96 pairs of R-CDTMs. In the subsequent portions of the Detailed Description hereinbelow, the reference numerals for the CDTMs will be accordingly concatenated with "R", "L", or "C" to indicate the particular level of the CDTMs as is deemed necessary and appropriate for the sake of contextual clarity.

FIG. 10B depicts an exemplary shelf arrangement interconnecting scheme between a link shelf, e.g., DS-0A link shelf 192-1, and an ADMIN shelf portion 190 of the modularized signaling server's rack wherein the placement of the clock/alarm distribution components is illustrated. The PLCE 32 and CSTG 112 disposed in the ADMIN shelf portion 190 as the front panel PBAs are coupled via CPCI bus segment 102. A Generic Transition Module (GTM) 191 is provided as the rear panel I/O board for the PLCE 32 to connect with the Ethernet Switch 46. Similarly, a rear panel TM 193 is provided for the CSTG 112 for coupling to the CDTM 1114. Further, the BCTM and CDTM boards are preferably placed behind the Power Supply Unit (PSU) board 194 in the ADMIN shelf 190.

The DS-0A link shelf 192-1 comprises a plurality of CPCEs, e.g., reference numeral 210, which are coupled to the Ethernet Switch 46 via suitable Application Node DS-0A Transition Modules (e.g., ANDTM 206). In addition, a plurality of DIMs 208 are provided which are coupled to the DS-0A links via DS-0A Transition Modules (e.g., DTM 204). CPCI bus segment 102 is provided on the backplane of the link shelf for interconnecting the CPCEs, DIMs and their respective TMs.

A link shelf BCTM 116 is coupled to the CDTM 114 of the ADMIN shelf 190 via appropriate bidirectional cabling 195 in accordance with the clock distribution scheme of the present invention. The cascaded clock and SFI signals are accordingly transported downstream from the CDTM 114 to the link shelf BCTM 116, and the alarm/Status signals and reference clocks derived from the telecommunications network signals received at the link shelf 192-1 are transported upstream from the link shelf BCTM 116 to the CDTM 114.

Figure 10C:
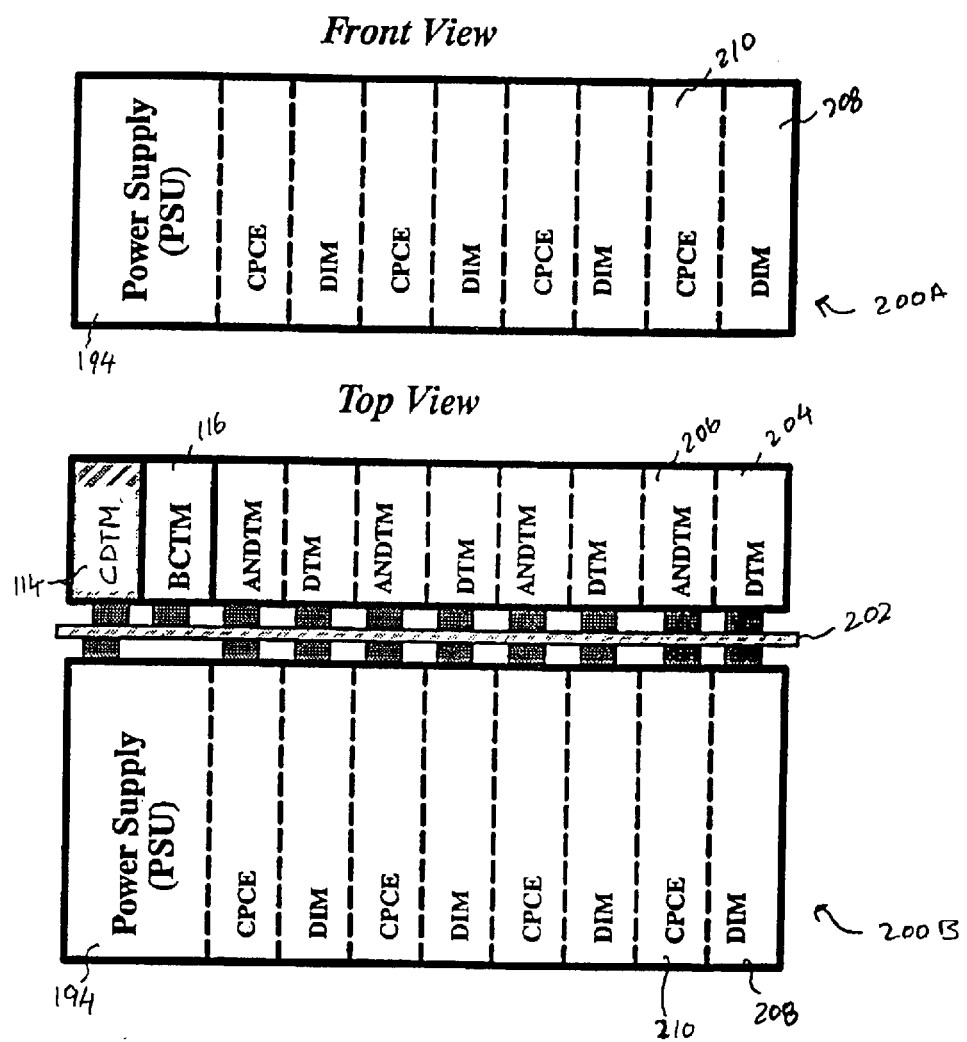
FIG. 10C illustrates a presently preferred exemplary placement scheme for positioning the CDM and BCM cards with respect to a Compact Peripheral Component Interconnect (CPCI) backplane disposed in a half-shelf.

FIG. 10C depicts two views of a sub-rack/shelf design exemplifying a backplane 202 with the various modules disposed thereon. Reference numeral 200A refers to a front view of the shelf backplane with the front panel modules such as, e.g., PSU 194, CPCE 210, DIM 208, etc. Reference numeral 200B refers to a top view of the backplane 202 wherein the rear panel TMs are positioned behind the backplane 202. The CDTM 114 and BCTM 116 are preferably located behind the front panel PSU 194.

Having set forth hereinabove the physical hierarchy of the exemplary three-level, three-stage distribution system used for delivering clock and SFI signals downstream from the STG to the BCTMs, and for aggregating reference clocks and alarm/Status signals upstream to STG from the BCTMs, the various signals used in the practice of the present invention and their cascading schema may now described in greater detail as provided hereinbelow.

Figure 11A:
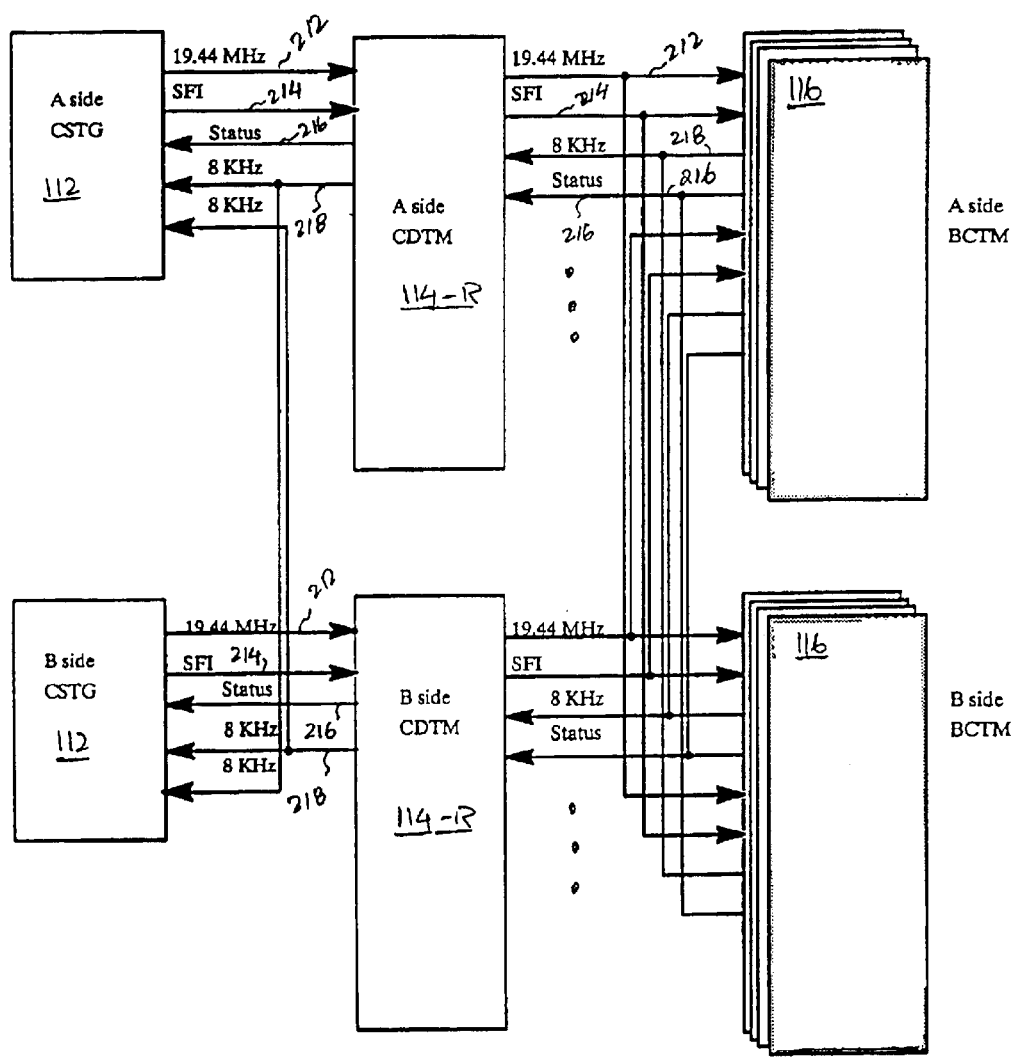
FIGS. 11A–11C depict three scalable, hierarchical levels of the three-stage clock/alarm distribution scheme depending on the number of signaling server racks provided at a network node.
Figure 11B:
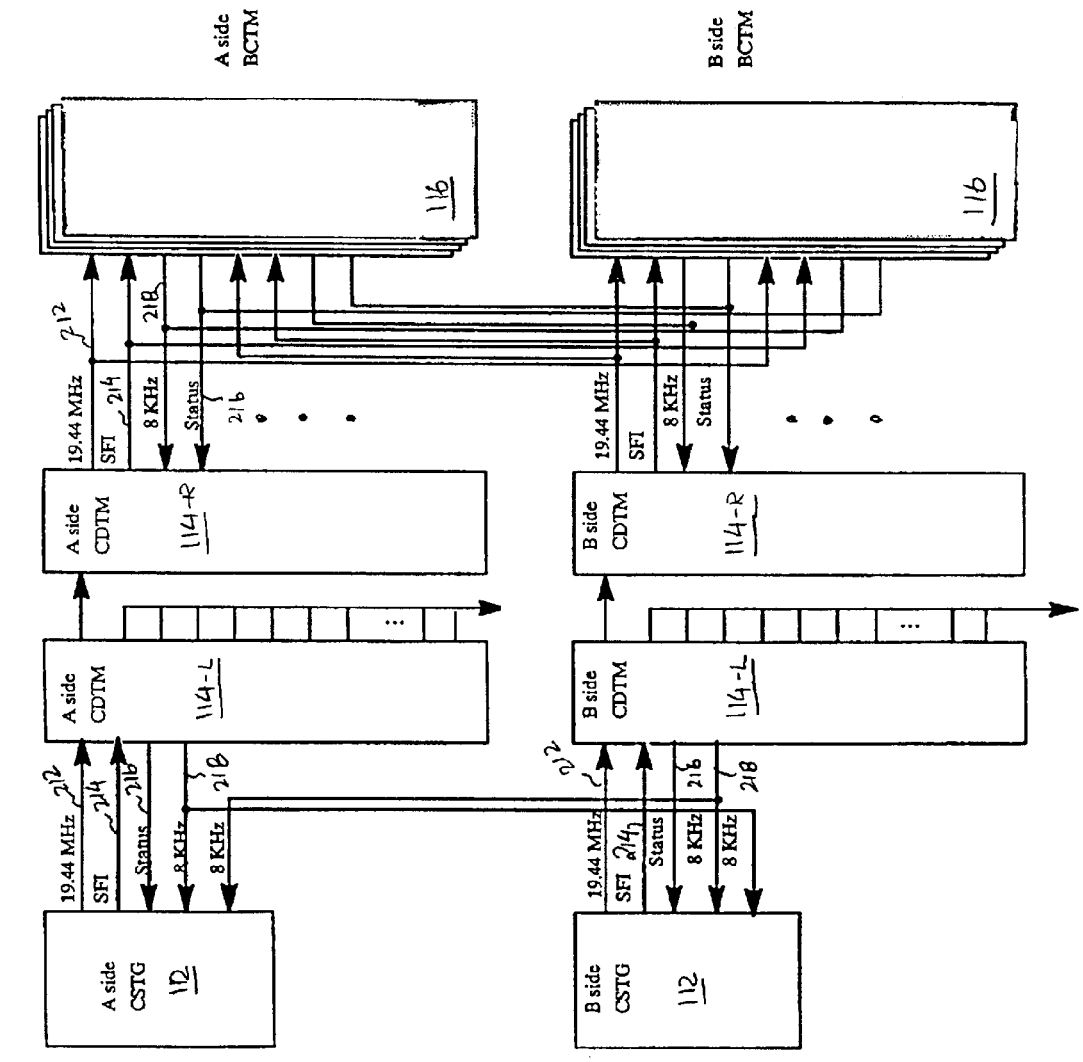
Figure 11C:
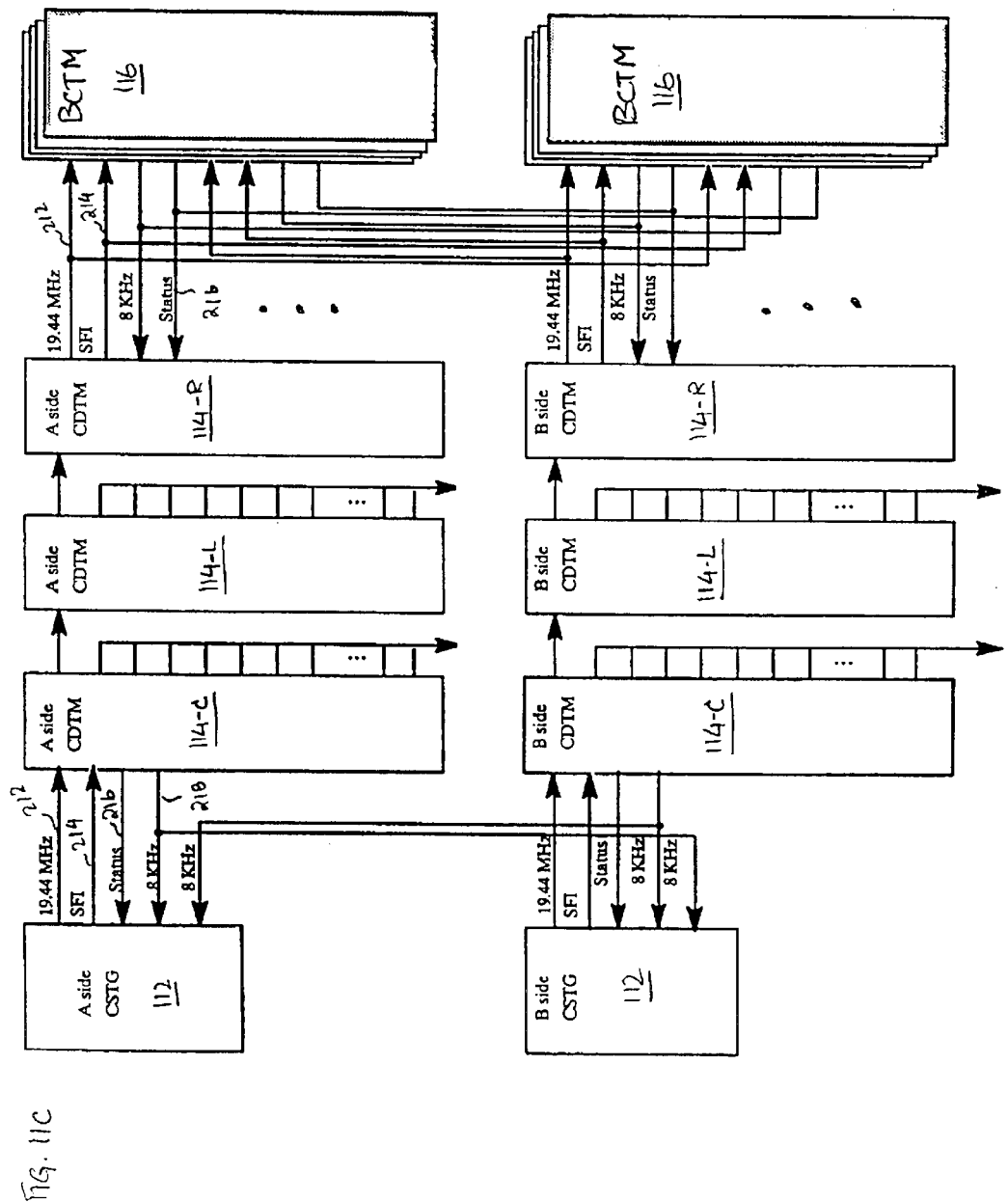

FIGS. 11A–11C depict three signal cascading schema of the three-stage clock/alarm distribution system based on the number of racks provided in the signaling server. Specifically, FIG. 11A illustrates the signal cascading scheme for use in a single rack signaling server system. Four distinct signals are provided for effectuating clock distribution and alarm/Status collection: two outbound signals—the internal clock signal 212 and the framed SFI signal 214; and two inbound signals—the reference clock signal 218 and the Status signal 216. The clock signal 212 is the system clock generated by the CSTG 112 based on reference inputs for providing an appropriate time base for the internal operations of the signaling server. Whereas it may be desirable to have a very high rate for the clock 212, it is recommended that it operate at a rate that overcomes the difficulty to distribute it through cables and still meets the jitter requirements at the network interfaces which may use inexpensive Phase Lock Loops (PLLs). In a presently preferred exemplary embodiment of the present invention, the clock 212 preferably runs at around 19.44 MHz.

The SFI signal 214 has a rate preferably equal to the rate of the clock 212 in order to achieve maximum bandwidth. It is a framed signal which transports, inter alia, the following positional information:
  the position of the Frame (preferably set at 125 $\mu$s) which coincides with the phase of a Composite Clock (CC) when CC is used a reference input by the CSTG 112;
  the position of the Superframe for T1 and E1 line signals;
  the position of the Extended Superframe which marks the beginning of the Status signal.

The reference clock 218 is a clock signal derived from the network interfaces based on the telecommunications signals received thereat. The nested hierarchy of the BCTM and CDTM cards provides a tree structure which allows system software to select a particular reference clock derived from any network interface signal.

The Status or Extended Alarm Signal (EAS) 216 is a framed signal generated by the BCTM cards 116 and multiplexed up through the multistage chain to the CSTG cards 112. In a presently preferred exemplary embodiment of the present invention, the EAS signal 216 runs at a much lower rate than the system clock 212 and transports alarms and other signals collected from the BCTM and CDTM cards. Further, it does not have a clock associated therewith in the exemplary embodiment depicted herein, as each CDTM and BCTM card can synthesize an appropriate reading clock (around 1 MHz) by using the outbound clock and SFI signals.

Continuing to refer to FIG. 11A, both A- and B-sides of the multistage distribution system are illustrated. The outbound signals generated by the CSTG 112 are provided to the rack level CDTM 114-R on the each side. Each CDTM 114-R then provides a clock fan-out 212 for eight BCTMs 116. Similarly, the SFI signal is also driven to eight BCTMs after the BCTM port ID information is inserted by the CDTM 114-R. The outbound clock 212 and SFI signal 214 from the A-side are also provided to the B-side BCTM and vice versa for the sake of redundancy. Further, each CDTM-R 114-R receives the inbound EAS signal 216 and reference clock 218 from BCTMs 116 of both A- and B-sides.

FIG. 11B depicts the signal cascading scheme for a system having between two and eight racks. A second level CDTM-L (reference numeral 114-L) is provided in each redundant side of the distribution scheme which provides a fan-out for the clock 212 and SFI 214 signals for up to eight CDTM-R 114-R cards each of which, in turn, drives eight BCTM cards 116 appropriately as set forth above. The SFI 214, which is encoded with respect to uniquely identifying the lower level CDTM-R cards 114-R and the BCTM cards 116, is used in driving appropriate ports for distributing the clocks and SFI signals.

FIG. 11C depicts the signal cascading scheme for a signaling server having between 9 and 96 racks in total. A pair of CDTM-C cards 114-C are coupled to the CSTG cards 112, which drive up to twelve mid-level CDTM-L cards 114-L. Again, each CDTM-L card 114-L drives eight rack-level CDTM-R cards 114-R as described above. The framed SFI signal 212 generated by the CSTG 112 is appropriately encoded by the various levels of CDTMs as it is cascaded downstream towards the BCTMs. Further, the various alarm and Status signals generated by the BCTMs 116 are multiplexed by the CDTMs into the EAS signal 216 as they are propagated upstream towards the CSTG 112 for appropriate treatment by the system. The intermediary CDTMs also write their own alarm/Status information into the EAS signal 216 in the process.

Figure 12B:
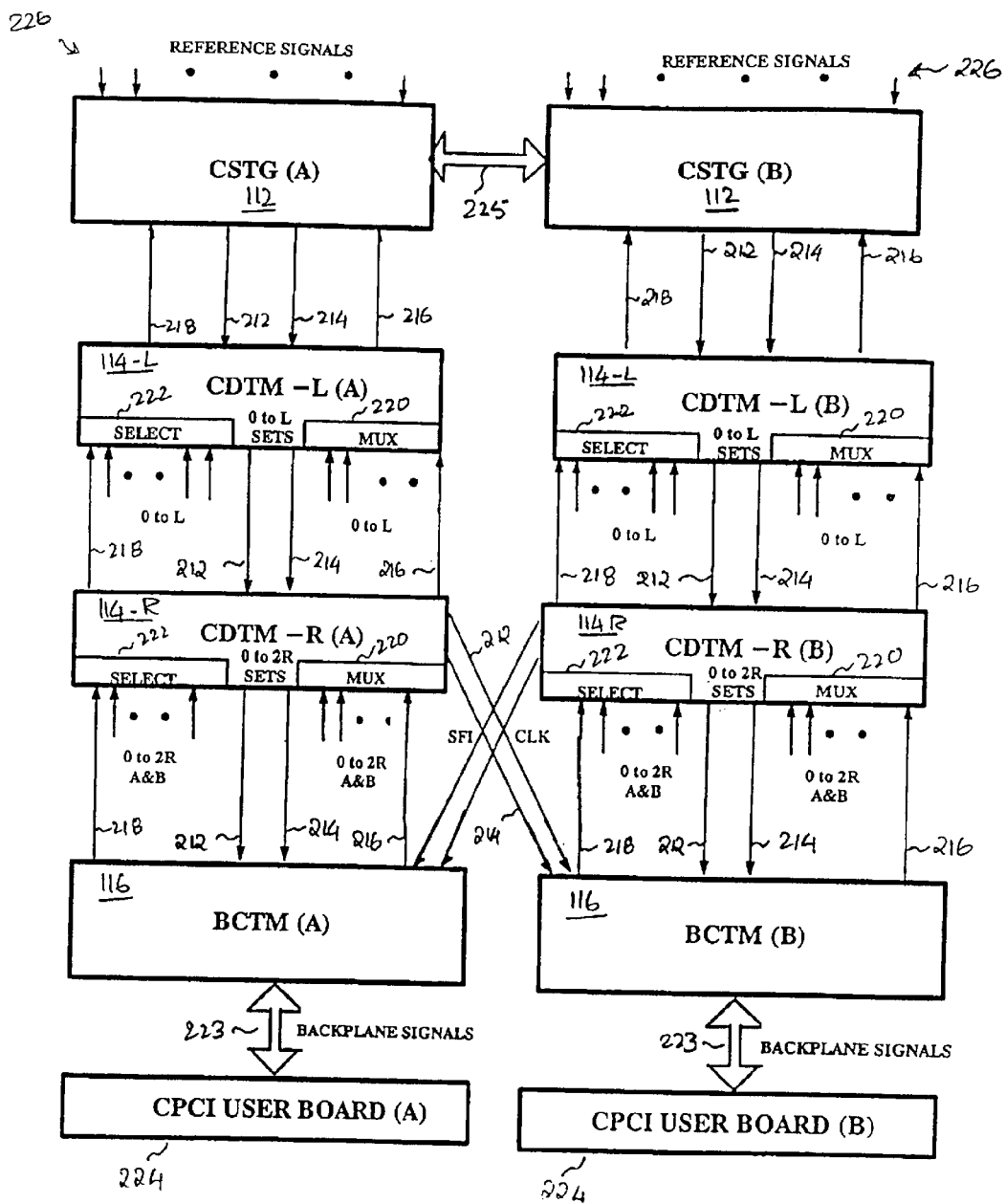
Figure 12C:
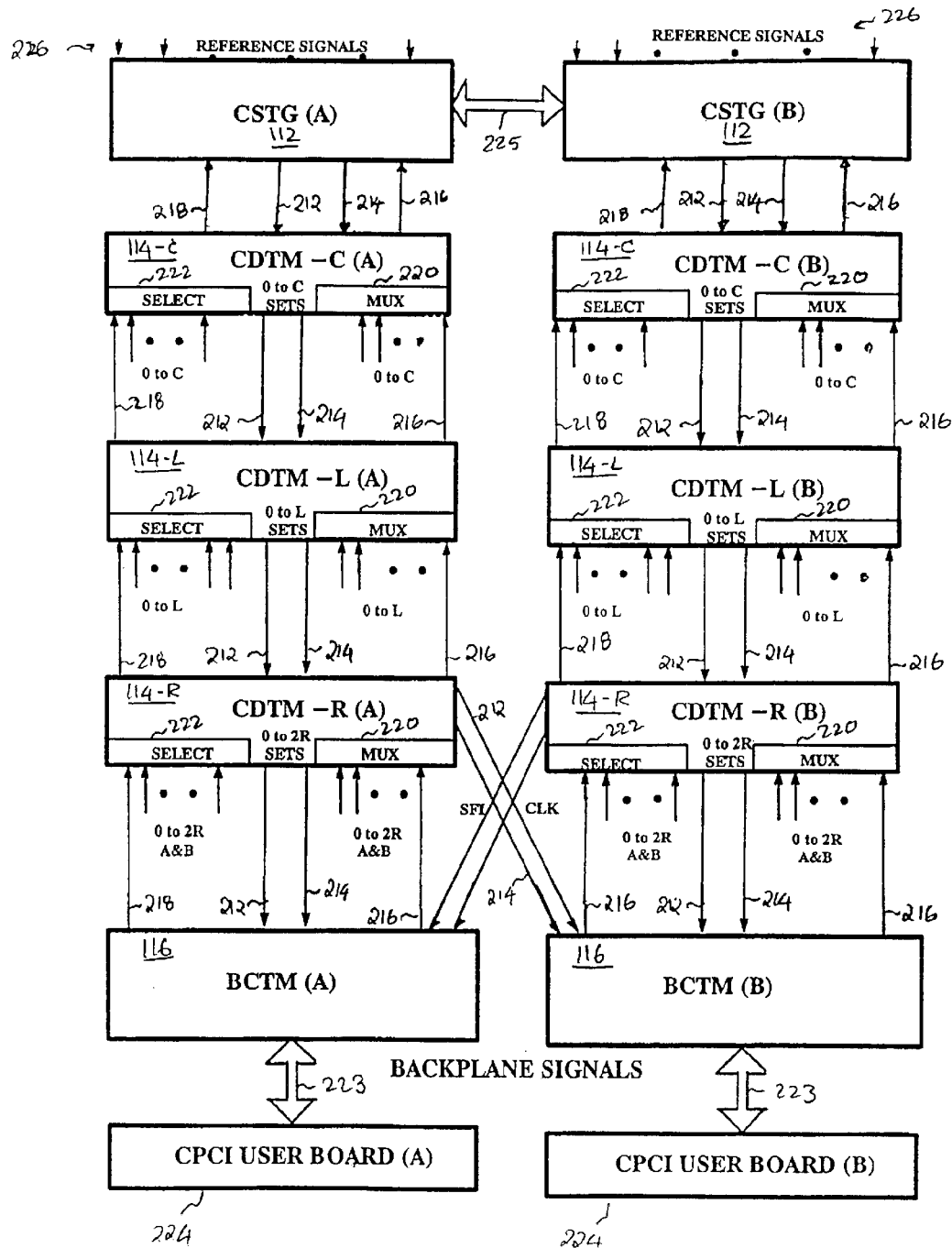

FIGS. 12A–12C depict another view of the three signal cascading schemes described above, particularly exemplifying the signal multiplexing and selecting aspects thereof. Those skilled in the art should readily appreciate that the views depicted in these FIGS. are essentially similar to the views provided in FIGS. 11A–11C and, accordingly, only the salient features thereof are set forth in detail herein.

FIG. 12A corresponds to the single rack situation wherein one pair of CDTM-R cards 114-R are used. Reference input signals 226 are provided to the CSTG pair 112 which communicate with each other via a mate signal path 225. This pair of CSTG cards is preferably configured to operate in a master-slave mode in order to minimize the skew between the corresponding timing signals generated by each card. The outbound signals, SFI 214 and the system clock signal 212, are cascaded via the CDTM-R cards 114-R to the BCTMs 116 which control the PBAs or CPCI user boards 224 in their respective half shelves through the backplane signals 223. Each CDTM-R card 114-R comprises a multiplexer 220 for muxing the R pairs (wherein R=1 to 8) of the EAS signals received from the BCTMs 116. Similarly, the CDTM-R card 114-R includes a selector 222 for selecting a particular reference clock derived from the network signal interfaces depending upon the information received via the framed SFI signal from the CSTG 112.

FIGS. 12B and 12C correspond to the other two hierarchical signal cascading schema wherein each additional level of the CDTM stage in the three-stage distribution scheme also includes appropriate multiplexers for muxing the EAS signals and selectors for selecting a particular reference clock received from the level immediately prior to it. Accordingly, the CDTM-L cards 114-L comprise a multiplexer 220 for muxing up to eight EAS signals received from the CDTM-R cards 114-R and the CDTM-C cards 114-C comprise a multiplexer 220 for muxing up to twelve EAS signals received from the CDTM-L cards 114-L. Similarly, the selectors 222 are hierarchically disposed for selecting from up to eight reference clocks from the CDTM-R cards and from up to twelve reference clocks from the CDTM-L cards.

Further details regarding the architecture of the multistage clock/alarm distribution system, level assignment and identification of the CDTMs and BCTMs using the framed SFI signal, and the exemplary signaling protocols used for the Time-Division Multiplexed SFI and EAS signals are provided in the following co-pending commonly owned patent applications which have been cross-referenced hereinabove and are incorporated by reference herein: (1) "Method and Apparatus for Routing Alarm Signals in a Signaling Server," filed Dec. 13, 2001 Ser. No. 10/020,619, in the name(s) of: Val Teodorescu; and (2) "Clock Distribution Scheme in a Signaling Server," filed Mar. 31, 2000, Ser. No. 09/541,002 now U.S. Pat. No. 6,643,791 issued Nov. 4, 2003 in the name(s) of: Val Teodorescu.

Figure 13A:
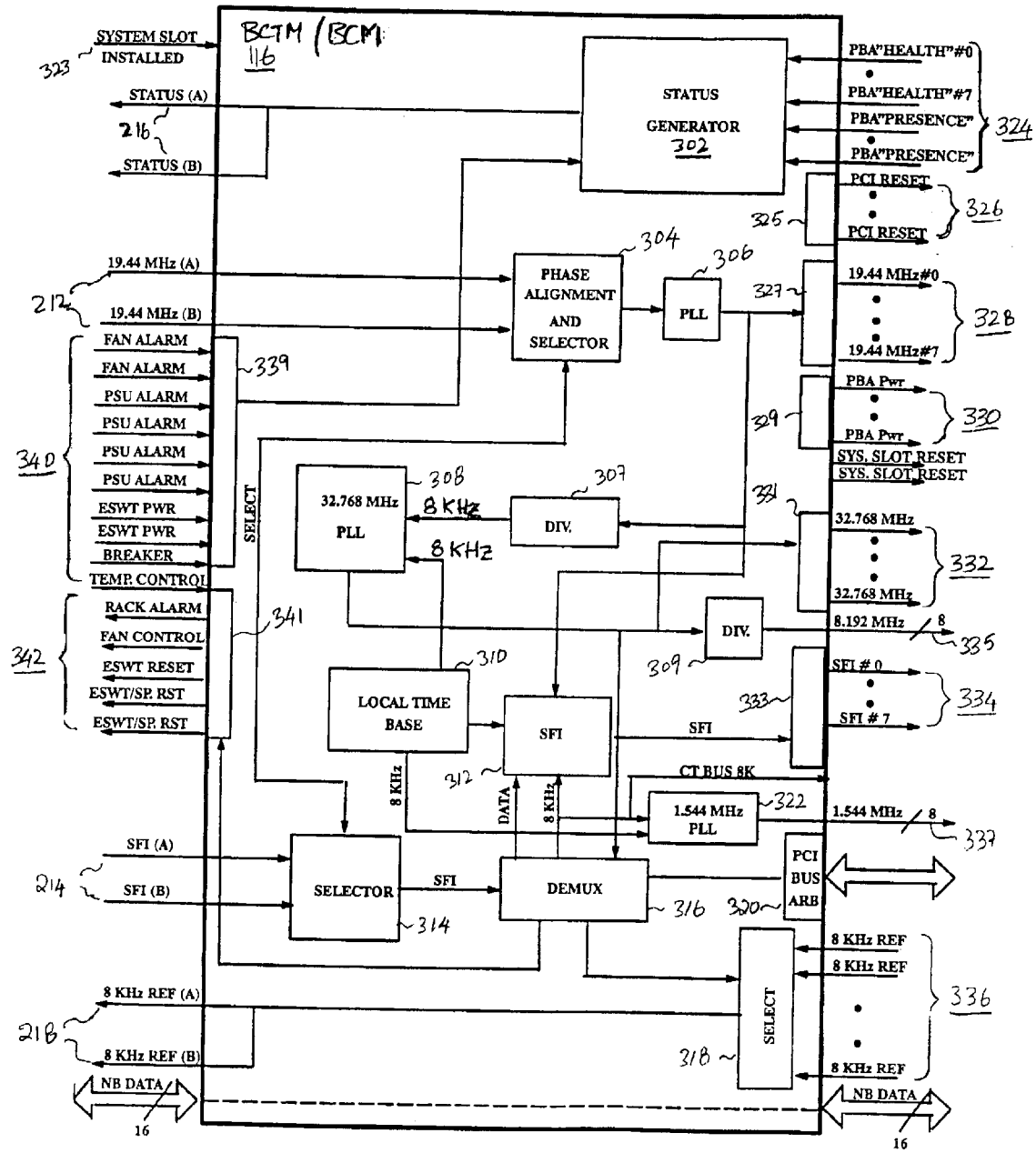
FIG. 13A depicts a functional block diagram of a presently preferred exemplary BCM used in the three-stage clock/alarm distribution system of the present invention.

Referring now to FIG. 13A, depicted therein is a functional block diagram of a presently preferred exemplary BCM (e.g., BCTM 116) provided in accordance with the teachings of the present invention for use in the three-stage clock/alarm distribution system set forth hereinabove. As has been pointed out in the foregoing, the BCM 116 provides clock selection, clock distribution, and reset generation for the line interface cards (also known as application cards or nodes (ANs)) within the signaling server link shelf. It also provides a TDM serial Status bitstream which informs the STG of the operational status of the BCM card and transmits any alarm information up through the multistage chain for processing.

A status generator 302 receives a plurality of alarm signals 340 and PBA signals 324 to generate a pair of TDM EAS/Status signals 216 which are supplied to the R-Level CDTMs on A- and B-sides of the distribution system. Similarly, the system clock signals 212 are supplied to the BCTM 116 from both A- and B-sides and are provided to a phase alignment and selector 304. After ensuring phase alignment and selecting a particular timing plane, the system clock is provided to a PLL 306 which generates a fan-out of eight system clocks 328 locked thereto to be provided to the PBAs or ANs via interface 327.

An SFI selector 314 selects between the two incoming SFI planes 214 and provides the selected SFI bitstream to a decoder/demultiplexer 316. Decoded SFI data is provided to an SFI block 312 which generates eight copies of the outgoing SFI signal 334 to be provided via SFI signal interface 333 to the PBAs based on their IDs. Preferably, the PBA ID is comprised of two fields: BCTM ID provided in the incoming SFI 214 and PBA's CPCI bus ID. A local time base 310 is included in the BCTM 116 to keep alive the SFI block 312 in the event both timing planes are lost. A suitable code is preferably inserted in the outgoing SFI signals 334 to alert the PBAs that the BCTM 116 is operating under the local time base. The local time base 310 is also used to keep alive two PLLs, reference numerals 308 and 322, which are provided for generating other clock outputs from the BCTM 116. The PLL 308 also receives a clock input as its primary source from the output of the PLL 306 which supplies the 19.44 MHz outgoing clocks 328. A 19.44 MHz clock is appropriately divided by a clock divider 307 to generate an 8 KHz clock input to the PLL 308. The output of the PLL 308 is provided as a plurality of CPCI bus clocks (preferably at around 32.768 MHz) 332 to be supplied via interface 331 to the CPCI slots which support the PBAs. Another clock divider 309 is coupled to the output of the PLL 308 to drive eight 8.192 MHz clocks as outgoing clock signals from the BCTM 116.

A plurality of incoming reference clock signals 336 derived from the network signals at the line interface cards are provided to a selector 318 in the BCTM 116. Based on the encoded data in the SFI signal 214 which is demuxed by the demultiplexer 316, an appropriate derived clock is selected to be provided as the reference clock signal 218 to the R-Level CDTMs on both A- and B-sides of the distribution system. Additional details regarding the reference clock selection process in the multi-stage distribution system are provided in the following co-pending commonly assigned patent application which has been incorporated by reference hereinabove: "Clock Distribution Scheme in a Signaling Server," filed Mar. 31, 2000, Ser. No. 09/541,002 now U.S. Pat. No. 6,643,791 issued Nov. 4, 2003, in the name(s) of: Val Teodorescu.

In accordance with the teachings of the present invention, a CPCI bus arbitrator block 320 is provided for enabling the BCTM 116 to operate in a CPCI bus system controller mode responsive to the logic levels of the "System Slot Installed" signal input 323 and the demuxed SFI data received from the STG. A plurality of CPCI resets 326 via reset interface 325 and system slot resets 347 are provided in regard to the CPCI bus system controller functionality as will be described in greater detail hereinbelow. Additional resets, e.g., Ethernet switch resets, rack alarm LED signals and fan control signals, collectively signals 342, are provided via interface 341 based on the decoded SFI data.

Figure 13B:
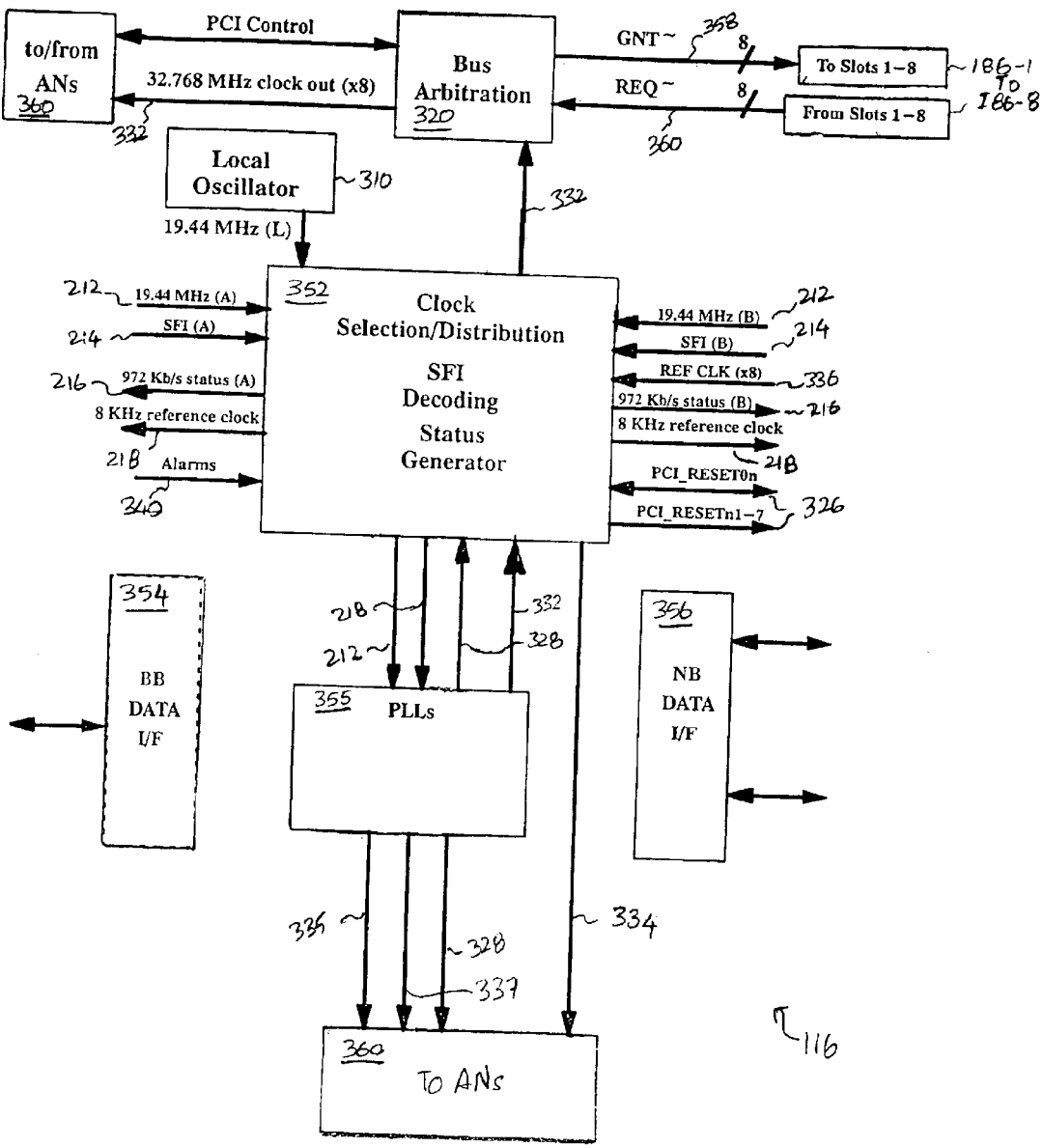
FIG. 13B depicts another view of a functional block diagram of a presently preferred exemplary BCM used in the three-stage clock/alarm distribution system.

Referring now to FIG. 13B, another view of a functional block diagram of a presently preferred exemplary BCM 116 is shown therein. Those skilled in the art should readily understand that the input signals and output signals shown in this view are essentially identical to those described hereinabove with respect to FIG. 13A and, accordingly, only the salient features of this view are set forth below.

The overall functionality of the BCTM 116 is preferably distributed among three major components: (i) bus arbitrator block 320; (i) an SRAM-based Field Programmable Gate Array (FPGA) 352 for SFI decoding and EAS generation; and (iii) a consolidated PLL block 355 which includes the PLLs depicted in FIG. 13A for generating appropriate clock signals as described hereinabove.

The CPCI bus arbitrator block 320 is preferably provided as a Complex Programmable Logic Device (CPLD) for effectuating CPCI bus control with respect to the ANs 360 via CPCI control messaging 359 and plural CPCI bus clocks 332. Further, as part of BCTM's bus system controller functionality, the CPCI bus arbitrator block 320 is responsible for driving appropriate bus arbitration signals, i.e., bus request or REQ# signals 360 from the slots and bus grant or GNT# signals to the slots. Also, as described in the foregoing, the bus clocks 332 are provided by means of the internal PLLs of the BCTM.

The FPGA block 352 receives the A-side and B-side system clocks 212 and selects an appropriate timing plane and switches between them as may be necessary. A local oscillator is provided as local time base 310 in the event of dual plane input timing failures. Clock distribution functionality of the BCTM may be itemized as follows:

The BCTM selects a 19.44 MHz clock signal (from A-side R-Level CDTM, B-side R-Level CDTM, or from the local time base 310) and provides it as the input to the on-board PLL block 355.

The BCTM drives eight copies of the 19.44 MHz PLL output clock signal 328, one to each of the ANs 360 (i.e., line interface cards such as T1 card, E1 card, DS-0A card in link shelf) installed in slot-1 through slot-8. Preferably, these clocks are driven single-ended at 3.3V signal levels.

A local 19.44 Mbps SFI signal is provided by the BCTM to be used in the event of a dual-plane timing failure.

The BCTM drives eight copies of the selected SFI signal to each of the cards in slot-1 through slot-8. Preferably, these SFI bitstreams 334 are re-timed with the PLL clock output and driven single-ended at 3.3V signal levels.

A 1.544 MHz clock 337 is generated by the BCTM by means of the PLL block 355 based on an 8 KHz framing signal 217 decoded from the selected SFI signal. Eight copies of this clock signal are driven single-ended point-to-point such that each card receives one copy.

Also based on the 8 KHz framing signal 217 decoded from the selected SFI signal, the PLL block 355 generates an 8.192 MHz clock 335 in eight copies to be supplied to the ANs.

The BCTM provides a copy of the 8 KHz input signal derived from the selected 19.44 MHz clock to the backplane.

Eight reference clocks (operating at 8 KHz) 336 are received by the BCTM, at single-ended 3.3V signal levels, from each of the ANs (or, PBAs) and, based on the SFI commands, selects one clock 218 for upstream transport through the multi-state distribution system.

The SFI decoding functionality of the BCTM 116 provided in accordance with the teachings of the present invention may be itemized as follows:

The BCTM determines in which frame it is installed by decoding appropriate fields that are inserted into the SFI bitstream by the CSTG and the CDTM cards.

The BCTM determines its position within a frame by decoding an appropriate field in the SFI bitstream.

The BCTM determines if it is to operate in bus system controller mode (i.e., to perform system slot functions—drive CPCI clocks, perform bus arbitration, and generate CPCI resets) by the status of the system slot indicator signal 323 which is provided as CPCI SYSEN# signal. If the BCTM senses a logic 1 on the signal, it assumes the bus system controller mode and performs system slot functions. If the logic sensed on the signal is 0, then the BCTM does not operate as the system slot. Instead, slot-1 card operates as the system slot board and the BCTM CPCI clock drivers and GNT drivers are preferably tri-stated.

The BCTM provides 8-bit parity checking (Bit Interleaved Parity or BIP) with respect to the incoming SFI datastreams. Preferably, if the calculated BIP-8 does not match the value embedded in the SFI, the BCTM may ignore the actions specified in the selected SFI.

Also, the BCTM preferably checks both incoming SFI datastreams for double-bit transmission errors and may not perform any actions specified in the selected SFI if any such errors occur therein.

The BCTM also provides automatic clock switchover in the event of Loss of Signal (LOS) or other error conditions.

The FPGA block 352 is also provided with various alarm inputs 340 and status information from the PBAs which are multiplexed into the serial Status signal 216. Preferably, the BCTM uses the rack ID fields within the SFI to determine the appropriate frame periods in which It should drive the status indicators. Also, the PBA code for the selected reference clock derived from the network signal(s) is inserted in to suitable fields of the Status signal. The alarm inputs 340 preferably include PSU, breaker panel, and fan alarms, among others. In addition, power status of the Ethernet switches is also monitored and appropriately reported. Further details regarding the EAS signal construction and the alarm/status encoding thereof may be found in the following co-pending commonly assigned patent application which has been incorporated by reference hereinabove: "Method and Apparatus for Routing Alarm Signals in a Signaling Server," filed Dec. 13, 2001 Ser. No. 10/020,619 in the name(s) of: Val Teodorescu.

Still continuing to refer to FIG. 13B, the presently preferred exemplary embodiment of the BCTM 116 also includes both broadband and narrowband data interfaces, reference numerals 354 and 356, respectively. In a presently preferred exemplary embodiment, the broadband data interface 354 is capable of operating at 155.52 MHz or 622.08 MHz levels. The narrowband data interface 356 is provided to operate at 4.096 MHz.

Referring now to FIG. 14, depicted therein is a simplified hardware block diagram of the BCTM 116 of the present invention. Nine different hardware blocks are preferably exemplified: external connectors 402A and 402B, RS-485 transceiver 404, clock skew adjustment circuitry 406, RS-422 drivers/receivers 414, buffers 408 and 412, PLLs 355, PCI bus control and arbitration block 320, and backplane connector 410. The external connector 402A is provided for interconnecting the BCTM with the R-Level CDTMs and thus receives the system clock and SFI signals therefrom and drives the reference clock and EAS signals thereto. Narrowband data interface functionality of the BCTM is realized using the external connector 402B.

The BCTM receives the incoming system clock signals and SFI bitstreams from the CDTMs differentially at RS-485 signal levels via the RS-485 transceiver 404. It also transmits the selected reference clock signal and serial EAS signal at RS-485 levels. Preferably, the component used to implement these interfaces is provided with control pins which are strapped appropriately to employ drivers and receivers in a single package.

The BCTM drives its input clocks and SFI from the RS-485 transceiver 404 to clock skew adjustment circuitry 406 to reduce any skews between the A-side and B-side input timing signals. Preferably, er the A- and B-side system clocks and SFI are provided to be in alignment at the output of the respective CSTG cards. However, as those skilled in the art should realize, appreciable clock skew is possible because each set of the clock signals goes through up to three hierarchical levels of CDTMs and three different sets of timing cables. The skew adjustment circuitry 406 preferably operates to minimize or eliminate the skew, if any, by employing a 5-tap delay line and a CPLD (not shown in this FIG.) to compare relative delayed signals and original undelayed signals. Both system clocks and SFI are first fed to the 5-tap delay line. Thereafter, the original undelayed signals as well as the five incrementally delayed versions are fed to the CPLD where the 8 KHz framing is extracted and used to determine which side, A or B, is leading and the appropriate amount of delay to insert in the leading side's clock and SFI to preferably time them up to the mate BCTM card's input timing. The clock and SFI are delayed together to maintain adequate setup and hold times on the SFI to the clock edge. The aligned A and B clocks and SFI are subsequently provided to the SFI decode and status generator FPGA 352.

As has been explained in the functional description set forth hereinabove with respect to FIG. 13B, the FPGA 352 performs the decoding of the incoming SFI bitstreams from the A and B R-Level CDTMs. Clock and timing selection is performed by the FPGA 352 preferably based on the status of the incoming timing source and/or encoded bit fields provided in the SFI data. Also, based on the encoded data in the SFI bitstream, the FPGA device 352 generates reset signals to be distributed to the PBAs. Additional details regarding the reset generation will be set forth below.

The BCTM reports back to the CDTMs various alarms and status conditions for upstream transport up to the CSTG for processing, as has been set forth in the foregoing. Some of the exemplary status indicators and error conditions are:
  degraded or failed PSUs and/or mate PSUs;
  fail indicators from the fan assembly and the mate fan assembly;
  Ethernet Switch alarms;
  Breaker panel alarm(s);
  LOS regarding A or B timing planes and/or errors therein;
  12-bit BCTM position; and
  PBA Health and Presence signals.

The functionality of the PLL block 355 which interfaces with the SFI decode and status generator 352 has been set forth hereinabove with respect to FIGS. 13A and 13B. Three PLLs, which are provided in order to generate 19.44 MHz, 8.192 MHz, and 1.544 MHz output clocks that are phase-locked to the selected 19.44 MHz input timebase (either A, B, or local timebase), are implemented with a 3.088 MHz VCXO, a 32.768 MHz VCXO, and a 38.88 MHz VCXO. A CPLD is used to count down the 3.088 MHz PLL output to 8 KHz (dividing by 386). The CPLD also counts down the 32.768 MHz PLL output to 8 KHz (dividing by 4,096). These counted-down 8 KHz outputs are fed to the inputs of a comparator of the phase detectors where they are kept phase-aligned with the signal input of the phase detector, which is preferably driven by the 8 KHz signal derived from the selected time base.

The 38.88 MHz PLL output is divided by 2 in the CPLD and fed back to the comparator input of the 38.88 MHz phase detector. This divided-by-2 clock (i.e., 19.44 MHz) is also driven to the eight CPCI slots. Further, the 3.088 MHz PLL output is also divided by 2 (resulting in 1.544 MHz) and driven to the eight CPCI slots. The 32.768 MHz PLL output is divided by 4 in the CPLD whereby the resulting 8.192 MHz clock is driven to the slots as well. The output of the 32.768 MHz PLL is used to provide the CPCI bus clock to the slots when the BCTM is configured to perform system slot functions by driving the SYSEN# high.

The BCTM utilizes buffers 408 and 412 that drive the clocks, SFI and narrowband data (via RS-422 drivers and receivers 414 connected to the external connector 402B) to and from the backplane connectors. In a presently preferred exemplary embodiment, the buffers are 3.3V buffers with 33 Ω series resistors on the outputs.

As explained in the foregoing, the CPCI bus control functionality of the BCTM (i.e., arbitration and providing bus clocks), embodied in the PCI bus control and arbitration block 320, is enabled when the SYSEN# signal is driven high. Otherwise, when the SYSEN# signal is driven low, the BCTM senses that there is a system controller card in slot-1 (i.e., system slot) and, accordingly, tri-states its CPCI bus clock drivers and bus grant drivers. In this "non-system slot" mode, the BCTM accepts a 33 MHz PCI clock and a reset signal from the system controller card/board in slot-1. Thereafter, it drives the reset signal out to the remaining slots, slot-2 to slot-8, as qualified by the inhibit signals decoded from the selected SFI data stream.

Figure 15B:
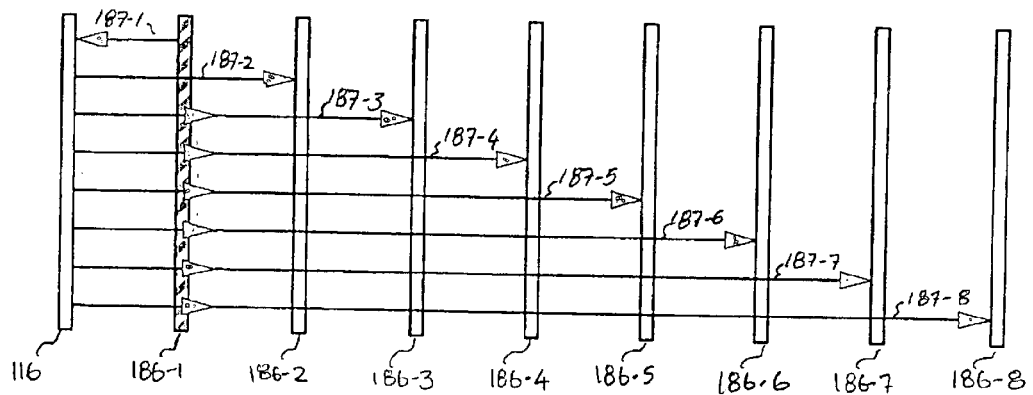
FIGS. 15A and 15B depict the mapping of REQ# and GNT# signal traces between the BCM card and the CPCI slots when the BCM is not operating as a CPCI bus system slot board.
Figure 15A:
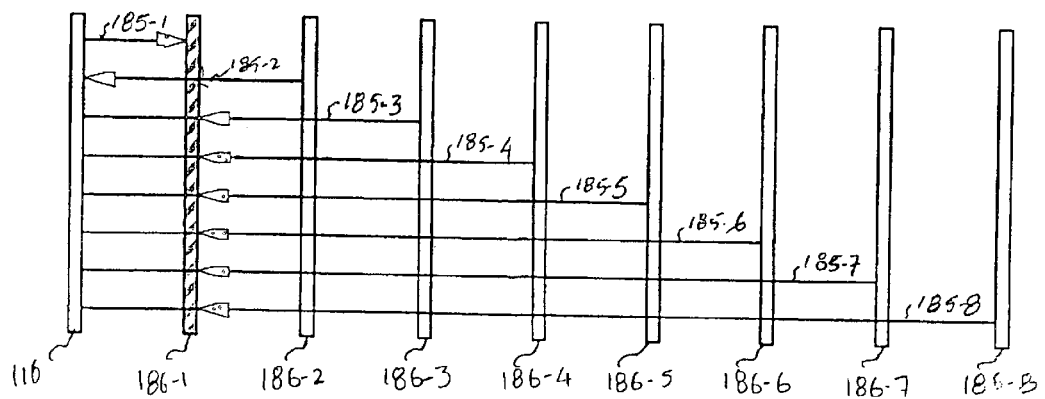

Referring now to FIGS. 15A and 15B, depicted therein are exemplary mapping schemes for the bus arbitration signals (i.e., REQ# and GNT# signals) when the BCTM 116 is not in the "system slot" mode. Responsive to SYSEN# being driven low, the BCTM 116 takes the bus request (REQ#) signal 185-2 from slot-2 186-2 and feeds it back as signal 185-1 to the system slot 186-1, which receives the remaining six REQ# signals 185-3 to 185-8 directly, as depicted in FIG. 15A. Similarly, in the non-system slot mode, the BCTM card 116 receives the GNT# signal 187-1 from the system slot 186-1 and loops it back out to slot-2 186-2 as signal 187-2. The remaining GNT# signals 187-3 to 187-8 are provided by the system slot board 186-1 directly.

Those skilled in the art should appreciate that the system slot board 186-1 loops the bus arbitration signals for one of the slots through the BCTM card because it needs to arbitrate only seven slots while the BCTM card provides arbitration for all eight slots on the bus segment. The advantage in this looping approach is that it minimizes jumper cabling as it requires no backplane strapping options on the REQ#/GNT# signals for each of the possible configurations when the BCTM's mode is switched between the system slot and non-system slot modes.

When the SYSEN# is driven high, the BCTM card 116 operates in the system slot mode and, accordingly, all eight REQ# signals 185-1 through 185-8 are inputs to the BCTM and all eight GNT# signals 187-1 through 187-8 are outputs from the BCTM. Also, the BCTM drives eight 32.768 MHz clock signals out on the CPCI bus clock pins with +5.0V buffers coupled to 22 Ω current limiting resistors. The arbitration function is preferably performed by the CPLD provided as part of the BCTM, which accepts eight REQ# signals and provides eight GNT# signals clocked with the outgoing PCI clock signal. Furthermore, the CPLD also drives the resets decoded from the SFI to the reset pin of the eight slots 186-1 to 186-8.

FIG. 16 depicts a presently preferred exemplary embodiment of the BCTM reset distribution scheme provided in accordance with the teachings of the present invention. It should be readily recognized by those skilled in the art that the reset distribution depends on whether the BCTM card is operating in the system slot mode or not. If slot-1 186-1 is equipped with a system slot board, the following reset distribution rules apply:

The SFI decoded reset 610-1 for slot-1 (i.e., slot #0, interchangeably) is applied to the Bus Master (BM) (PRST#) reset 611 on the system slot board 186-1.

Seven switches, 608-1 through 608-7, which drive seven PCI resets 612-1 through 612-7, select the system slot PCI reset # 0 line 612-0. That is, the BCTM drives the PCI reset signal to slots 2 through 8 (or, interchangeably, slot #1 through slot #7) with the PCI reset from slot-1 (i.e., reset # 0).

A 3-bit code 606 provided in the SFI signal actuates a switch inhibitor 604 which produces seven inhibiting signals 605-1 to 605-7 to disable a corresponding switch each. When the binary code is 111, switch-7 608-7 is inhibited; when the binary code is 110, switches 6 and 7 (608-6 and 608-7) are inhibited; when the binary code is 101, switches 5, 6, and 7 (608-5, 608-6 and 608-7) are inhibited; when the binary code is 100, switches 4 through 7 (608-4 to 608-7) are inhibited; when the binary code is 011, switches 3 through 7 (608-3 to 608-7) are inhibited; when the binary code is 010, switches 2 through 7 (608-2 to 608-7) are inhibited; when the binary code is 001, all switches, switch 1 through switch 7 (608-1 to 608-7) are inhibited; and, when the binary code is 000, no switch is inhibited.

If the BCTM card is operating in the system slot mode, i.e., slot-1 is equipped with a peripheral card, the following conditions arise:

The "System Slot Equipped" signal 323 disables the switch inhibitor 604.

The SFI decoded reset signal 610-0 for slot-1 is driven through a tri-stated buffer (TB) 602 as PCI reset #0 612-0 on the system slot board 186-1. The "System Slot Equipped" signal 323 is also used to enable/disable the tri-stated buffer 602.

All seven switches 608-1 to 608-7 select the SFI decoded reset signals 610-1 to 610-7.

It should be apparent that under both scenarios described above, additional SFI decoded reset signals are used for driving various other resets. For example, the ninth and tenth SFI reset signals (i.e., resets # 8 and #9) 610-8 and 610-9 are used for resetting the power supply 614 and 615 of the Ethernet Switches. The eleventh SFI reset signal 610-10 is used as a BCTM reset 616. The twelfth SFI reset 610-11 is provided as a reserved reset 617 for possible future use.

Figure 17A:
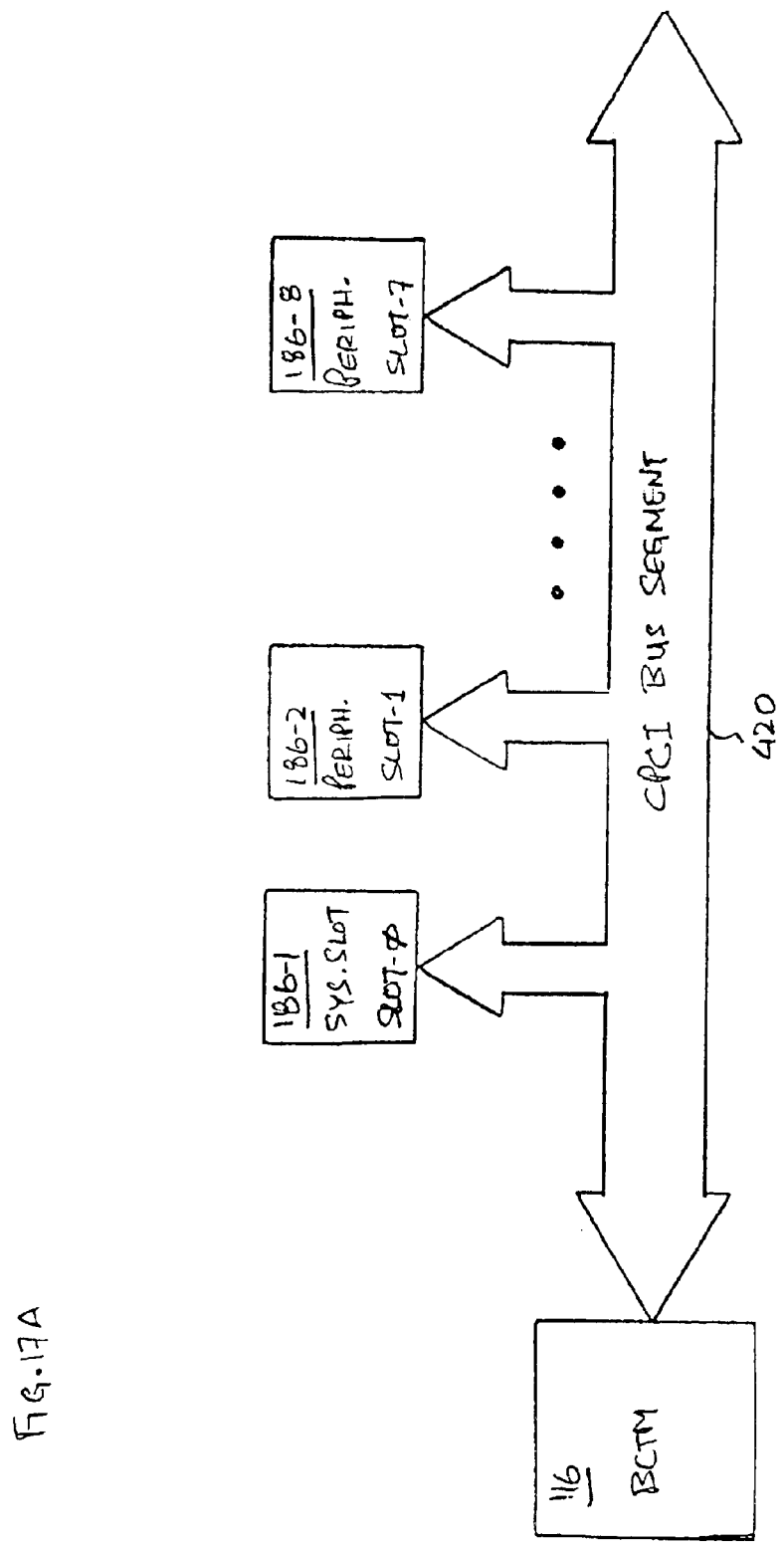
Figure 17C:
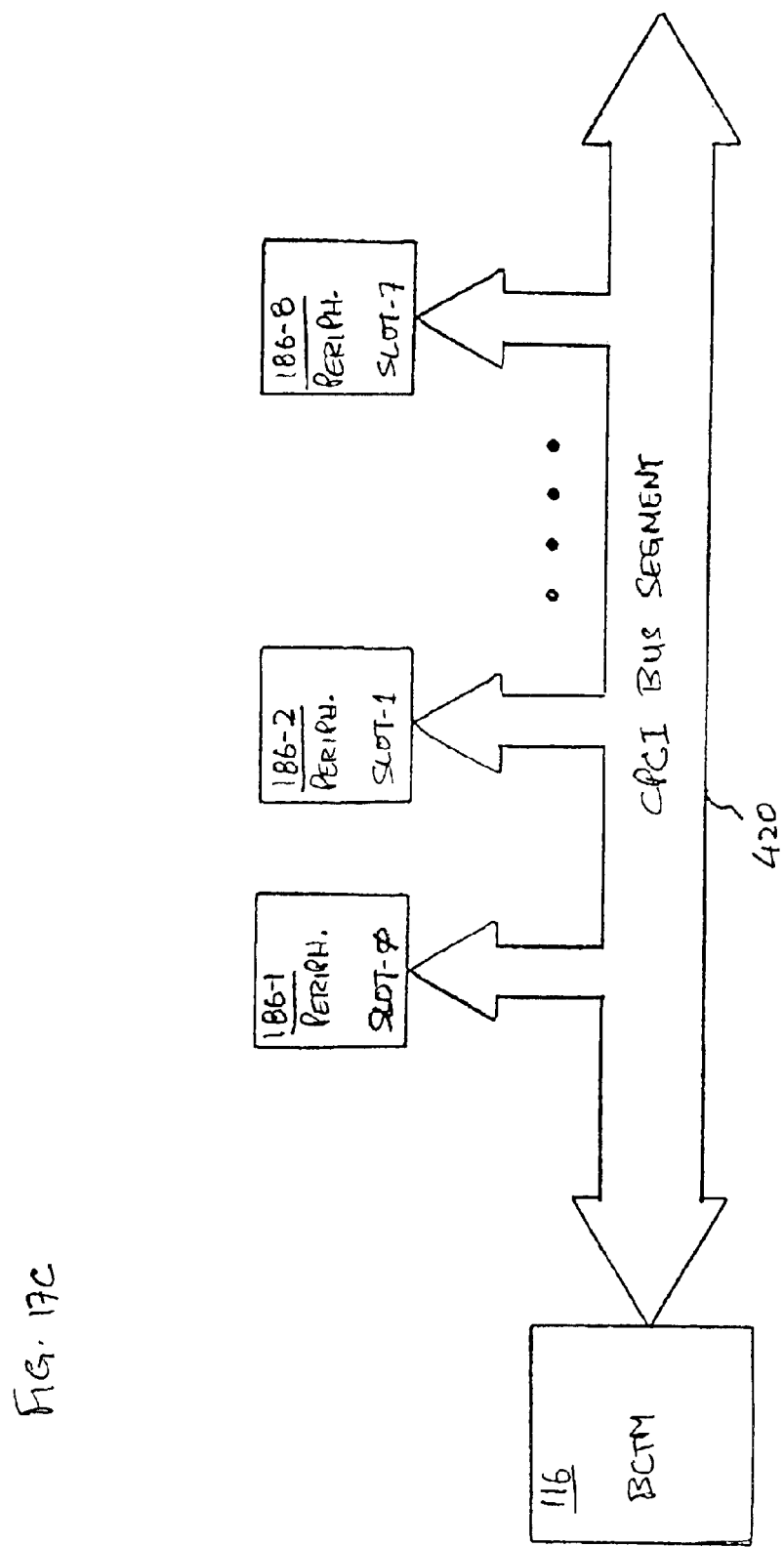

Referring now to FIGS. 17A–17C, depicted therein are three exemplary BCTM arrangements with varying degrees of bus control functionality. In the bus configuration shown in FIG. 17A, the BCTM 116 supports hot swap capability and operates in the pass-through, non-system mode. The system slot board 186-1 is provided as an off-the-shelf bus master for the CPCI bus segment 420 which interconnects the remaining seven slots equipped with either CPCI peripheral or a CPCE peripheral PBAs. The system slot card 186-1 provides CPCI interrupts, configuration cycles for enumeration, bus arbitration, CPCI clock distribution, resets, et cetera.

In the bus configuration shown in FIG. 17B, a CPCE is provided as a logical bus master in slot 186-1 working in conjunction with the BCTM. In this functionality, the CPCE provides CPCI interrupts and configuration cycles for enumeration. In addition, up to 7 CPCEs or off-the-shelf peripherals can be equipped in the 8-slot backplane. The BCTM card 116 is no longer in a pass-through mode and its functionality is expanded to include bus arbitration, clock distribution, CPCI resets, etc.

In the configuration depicted in FIG. 17C, the BCTM 116 supports the bus segment 420 without the assistance of a bus master and frees up the "system" slot for full peripheral connectivity. Accordingly, all eight slots may now be used for peripherals whereby additional functional capabilities are realized.

Based upon the foregoing Detailed Description, it should be readily apparent that the present invention provides an advantageous bus control module for use as an effective and robust terminal stage in a multi-stage distribution scheme for transporting telecom clocks and aggregating status/alarm conditions in a signaling server node that is provided with a scalable and redundant architecture for interoperability, ail upgradeability, and high availability. The bus control module of the present invention overcomes the shortcomings and deficiencies of the state-of-the-art solutions by combining clock distribution, reference clock generation and alarm collection functionalities, in addition to bus master functionality, in a single card without using less reliable processors or expending one of the slots on the bus segment on which it is disposed. By using CPLDs and FPGAs for effectuating these functionalities under the control of a serial control bitstream, reliability of the bus control module is further increased accordingly. In addition, by providing mated bus control module pairs for redundancy within a link shelf, the signaling server's availability is also significantly increased.

Moreover, by multiplexing the various alarm/status signals in an TDM bitstream in accordance with the teachings of the present invention, there no need to run separate cables from PBAs or shelves to the system controller and, accordingly, cabling becomes significantly more manageable and enhances the overall aesthetics of the server platform.

It is believed that the operation and construction of the present invention will be apparent from the foregoing Detailed Description. While the method and apparatus shown and described have been characterized as being preferred, it should be readily understood that various changes and modifications could be made therein without departing from the scope of the present invention as set forth in the following claims. For example, each EAS frame in the Extended Superframe format may be provided with a header for checking alignment, parity, line integrity (i.e., whether the line is broken or not), etc. If the header contains one or several errors, there is no need to further analyze the entire signal to determine that it has been compromised in some aspect.

Also, those skilled in the art should readily recognize that whereas a bus control module as a terminating stage in a three-level, three-stage cascading tree has been described in particular detail for distributing clocks, status information, alarms, etc., other intermediate levels and/or stages may be provided in certain implementations. In addition, while the CPCI bus and its form factor has been exemplified, the present invention is not limited in any way to such bus and form factor. Accordingly, the plurality of the cards used in the distribution scheme exemplified in the Detailed Description of the present patent application may adhere to other form factors and bus standards.

Furthermore, although a signaling server platform has been described in detail to provide a suitable application framework for the present invention, it should be firmly understood that the teachings of the present invention may be practiced in any industrial application, including other telecommunications network nodes. Similarly, the use of FPGAs, CPLDs, et cetera, is illustrative rather than restrictive. Those skilled in the art should recognize that various other logic devices, modules, processors, and the like may be used for achieving similar functionlity. Accordingly, all these numerous modifications, substitutions, additions, combinations, extensions, etc. are considered to be within the ambit of the present invention whose scope is limited solely by the following claims.

What is claimed is:

1. A bus control module as a terminal stage in a multi-stage distribution system disposed in a signaling server operating as a Signal Transfer Point in a telecommunications network, comprising:

decoding circuitry to decode a framed control signal received from an upstream stage of said multi-stage distribution system;

a status generator receiving a plurality of status signals from at least one line interface card disposed on a bus segment and controlled by said bus control module, said status generator for encoding said status signals in a predetermined frame of a framed serial status bitstream based on control data obtained from said framed control signal; and a Phase Lock Loop (PLL) module to lock on an incoming system clock signal received from said upstream stage of said multi-stage distribution system, said PLL module generating a copy of said system clock to be provided to said at least one line interface card.

2. The bus control module as set forth in claim 1, further comprising means to collect a plurality of alarms relating to at least one hardware component disposed in said signaling server, and wherein said alarms are multiplexed into said framed serial status bitstream by said status generator.

3. The bus control module as set forth in claim 2, wherein said hardware component comprises a fan assembly.

4. The bus control module as set forth in claim 2, wherein said hardware component comprises a power supply unit.

5. The bus control module as set forth in claim 2, wherein said hardware component comprises an Ethernet switch.

6. The bus control module as set forth in claim 1, further comprising a reference clock selector for selecting a reference clock signal provided by said line interface card, said reference clock signal comprising a derived clock signal generated from a telecommunications network signal received at said line interface card.

7. The bus control module as set forth in claim 6, wherein said derived clock signal has a frequency of 8 KHz.

8. The bus control module as set forth in claim 6, wherein said telecommunications network signal comprises a DS-0A signal.

9. The bus control module as set forth in claim 6, wherein said telecommunications network signal comprises a Synchronous Optical Network (SONET) signal.

10. The bus control module as set forth in claim 6, wherein said telecommunications network signal comprises a T1 signal.

11. The bus control module as set forth in claim 6, wherein said telecommunications network signal comprises an E1 signal.

12. The bus control module as set forth in claim 1, further comprising a local time base operating as a standby clock source when said incoming system clock signal received from said upstream stage of said multi-stage distribution system is defective.

13. The bus control module as set forth in claim 1, wherein said bus segment comprises a Compact Peripheral Component Interconnect (CPCI) bus segment.

14. A bus control module disposed as a stage in a multi-stage distribution system, comprising:

means for decoding a framed control signal received from an upstream stage of said multi-stage distribution system; and means for generating a framed serial status bitstream based on control data obtained from said framed control signal, said framed serial status bitstream including status data from a plurality of line interface cards disposed on a bus segment and controlled by said bus control module, wherein said framed serial status bitstream is provided to said upstream stage in a predetermined frame order.

15. The bus control module disposed as a stage in a multi-stage distribution system as set forth in claim 14, further comprising means for distributing a copy of an incoming system clock signal received from said upstream stage to each of said line interface cards.

16. The bus control module disposed as a stage in a multi-stage distribution system as set forth in claim 14, further comprising means for selecting a reference clock from a plurality of reference clocks provided by said line interface cards.

17. A bus control module disposed as a stage in a multi-stage distribution system, comprising:

means for decoding a framed control signal received from an upstream stage of said multi-stage distribution system and, responsive to the decoded framed control signal, for receiving an incoming system clock signal from said upstream stage; and means for distributing a copy of said incoming system clock signal to a each of a plurality of line interface cards disposed on a bus segment and controlled by said bus control module.

18. The bus control module disposed as a stage in a multi-stage distribution system as set forth in claim 17, further comprising means for generating a framed serial status bitstream, based on control data obtained from said framed control signal, said framed serial bitstream including status data from said line interface cards, wherein said framed serial status bitstream is provided to said upstream stage in a predetermined frame order.

19. The bus control module disposed as a stage in a multi-stage distribution system as set forth in claim 17, further comprising means for selecting a reference clock from a plurality of reference clocks provided by said line interface cards and providing the selected reference clock to said upstream stage of said multi-stage distribution system.

20. The bus control module of claim 19, wherein said means for selecting a reference clock is operative to select said reference clock based on said framed control signal.

* * * * *